US012715230B2

(12) United States Patent

Sugimoto et al.

(10) Patent No.: US 12,715,230 B2
(45) Date of Patent: Aug. 25, 2026

(54) RECORDING APPARATUS AND SHEET POSITION ADJUSTMENT METHOD OF RECORDING APPARATUS

(71) Applicant: CANON KABUSHIKI KAISHA, Tokyo (JP)

(72) Inventors: Masahiro Sugimoto, Kanagawa (JP); Junichi Ochi, Shizuoka (JP); Takuma Nakamura, Tokyo (JP); Yuichiro Yanagi, Chiba (JP); Kota Kawasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 18/638,366

(22) Filed: Apr. 17, 2024

(65) Prior Publication Data

US 2024/0351357 A1 Oct. 24, 2024

(30) Foreign Application Priority Data

Apr. 18, 2023 (JP) ................................. 2023-067978

(51) Int. Cl.
*B41J 15/04* (2006.01)
*B41J 2/155* (2006.01)
(Continued)

(52) U.S. Cl.
CPC ............. *B41J 15/046* (2013.01); *B41J 2/155* (2013.01); *B41J 11/002* (2013.01); *B41J 11/0095* (2013.01); *B65H 23/0322* (2013.01)

(58) Field of Classification Search
CPC ........ B41J 15/046; B41J 2/155; B41J 11/002; B41J 11/0095; B41J 11/00222;
(Continued)

(56) References Cited

U.S. PATENT DOCUMENTS

| | | | | |
|---|---|---|---|---|
| 10,358,309 | B2 * | 7/2019 | Yamane ............. | G03G 15/6567 |
| 2013/0278665 | A1 | 10/2013 | Imamura | |

(Continued)

FOREIGN PATENT DOCUMENTS

| | | | |
|---|---|---|---|
| EP | 3 321 089 | A1 | 5/2018 |
| JP | 2011-189640 | A | 9/2011 |
| JP | 6540033 | B2 | 7/2019 |

OTHER PUBLICATIONS

Extended European Search Report dated Sep. 30, 2024, in European Patent Application No. 24169577.4.

*Primary Examiner* — Justin Seo
(74) *Attorney, Agent, or Firm* — Venable LLP

(57) ABSTRACT

A recording apparatus includes a recording portion; a conveying portion that conveys the sheet, while imparting tension to the sheet, in a forward direction and a backward direction; a position detecting portion that detects a position of the sheet in a width direction of the sheet; a position adjustment portion that adjusts a position of the sheet in the width direction; and a control portion that executes a position adjustment operation in which, after conveying the sheet in the backward direction following a recording operation by the recording portion, the sheet is conveyed by the conveying portion in the forward direction while adjusting the position of the sheet in the width direction using the position adjustment portion. A conveying distance of the sheet in the backward direction in the position adjustment operation is determined on the basis of a detection result by the position detecting portion.

20 Claims, 23 Drawing Sheets

(51) Int. Cl.
*B41J 11/00* (2006.01)
*B65H 23/032* (2006.01)

(58) Field of Classification Search
CPC ...... B41J 11/0015; B41J 15/165; B41J 15/04; B41J 11/008; B41J 29/393; B65H 23/0322
See application file for complete search history.

(56) References Cited

U.S. PATENT DOCUMENTS

| | | | | |
|---|---|---|---|---|
| 2017/0266954 | A1* | 9/2017 | Nagasu | B41J 11/0095 |
| 2018/0194581 | A1* | 7/2018 | Matsumoto | B65H 7/10 |
| 2018/0257403 | A1 | 9/2018 | Yasuda et al. | |
| 2024/0217249 | A1 | 7/2024 | Sato et al. | |
| 2024/0253368 | A1 | 8/2024 | Sugimoto et al. | |

* cited by examiner

RECORDING APPARATUS AND SHEET POSITION ADJUSTMENT METHOD OF RECORDING APPARATUS

BACKGROUND OF THE INVENTION

Field of the Invention

The present invention relates to a recording apparatus that records an image on a sheet and a sheet position adjustment method of the recording apparatus.

Description of the Related Art

Conventionally, inkjet recording apparatuses and the like are known as recording apparatuses that eject ink to a recording medium with a continuous sheet shape wound in a roll and record characters and images. In line head recording apparatuses among such inkjet recording apparatuses, ink droplets are ejected from a recording head in conjunction with conveyance of a recording medium and characters and images are recorded on the recording medium in a state where the recording head does not move in a conveying direction of the recording medium with respect to a main body.

When intermittently performing a recording operation on a recording medium with a continuous sheet shape, a blank region (wasted paper region) in which an image is not formed is formed between a recording position of an image and a next recording position. Japanese Patent No. 6540033 discloses a configuration in which, in order to reduce a wasted paper region, after a recording operation, a recording medium is conveyed in a direction opposite to a direction during the recording operation.

SUMMARY OF THE INVENTION

On the other hand, when a recording medium is conveyed while being tautened by a roller or the like, a position in a width direction that is perpendicular to a conveying direction of the recording medium may become displaced. When the position of the recording medium in the width direction is displaced when conveying the recording medium in the opposite direction in the configuration described above, positions of characters and an image that are recorded on the recording medium by a subsequent recording operation may become displaced from target positions and an appearance of the image may decline.

The present invention has been made in consideration of the problem described above and an object thereof is to provide a recording apparatus capable of reducing a wasted paper region and suppressing a decline in the appearance of the image.

In order to achieve the object described above, a recording apparatus according to the present invention includes:

a recording portion that records an image on a sheet;

a conveying portion that conveys the sheet, while imparting tension to the sheet, in a forward direction being a conveying direction during a recording operation and a backward direction being opposite to the forward direction;

a position detecting portion that detects a position of the sheet in a width direction of the sheet, the width direction intersecting with the forward direction;

a position adjustment portion that adjusts a position of the sheet in the width direction on an upstream side in the forward direction of the recording portion; and a control portion that executes a position adjustment operation in which, after conveying the sheet in the backward direction following a recording operation by the recording portion, the sheet is conveyed by the conveying portion in the forward direction while adjusting the position of the sheet in the width direction by the position adjustment portion, wherein a conveying distance of the sheet in the backward direction in the position adjustment operation is determined on the basis of a detection result by the position detecting portion.

Furthermore, in order to achieve the object described above, a sheet position adjustment method of a recording apparatus including a recording portion that records an image on a sheet, a conveying portion that conveys the sheet, while imparting tension to the sheet, in a forward direction being a conveying direction during a recording operation and a backward direction being opposite to the forward direction, a position detecting portion that detects a position of the sheet in a width direction of the sheet, the width direction intersecting with the conveying direction, and a position adjustment portion that adjusts a position in the width direction of the sheet on an upstream side in the forward direction of the recording portion, the sheet position adjustment method comprising the steps of:

performing a reverse conveyance in which, after an end of the recording operation, the sheet is conveyed in the backward direction by a conveying distance that is determined on the basis of a detection result by the position detecting portion; and performing a forward conveyance in which, after completion of the step of performing the reverse conveyance, the sheet is conveyed in the forward direction while adjusting the position of the sheet in the width direction with the position adjustment portion.

The present invention can provide a recording apparatus capable of reducing a wasted paper region and suppressing a decline in the appearance of the image.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments.

First Embodiment

Recording Apparatus

Figure 1:
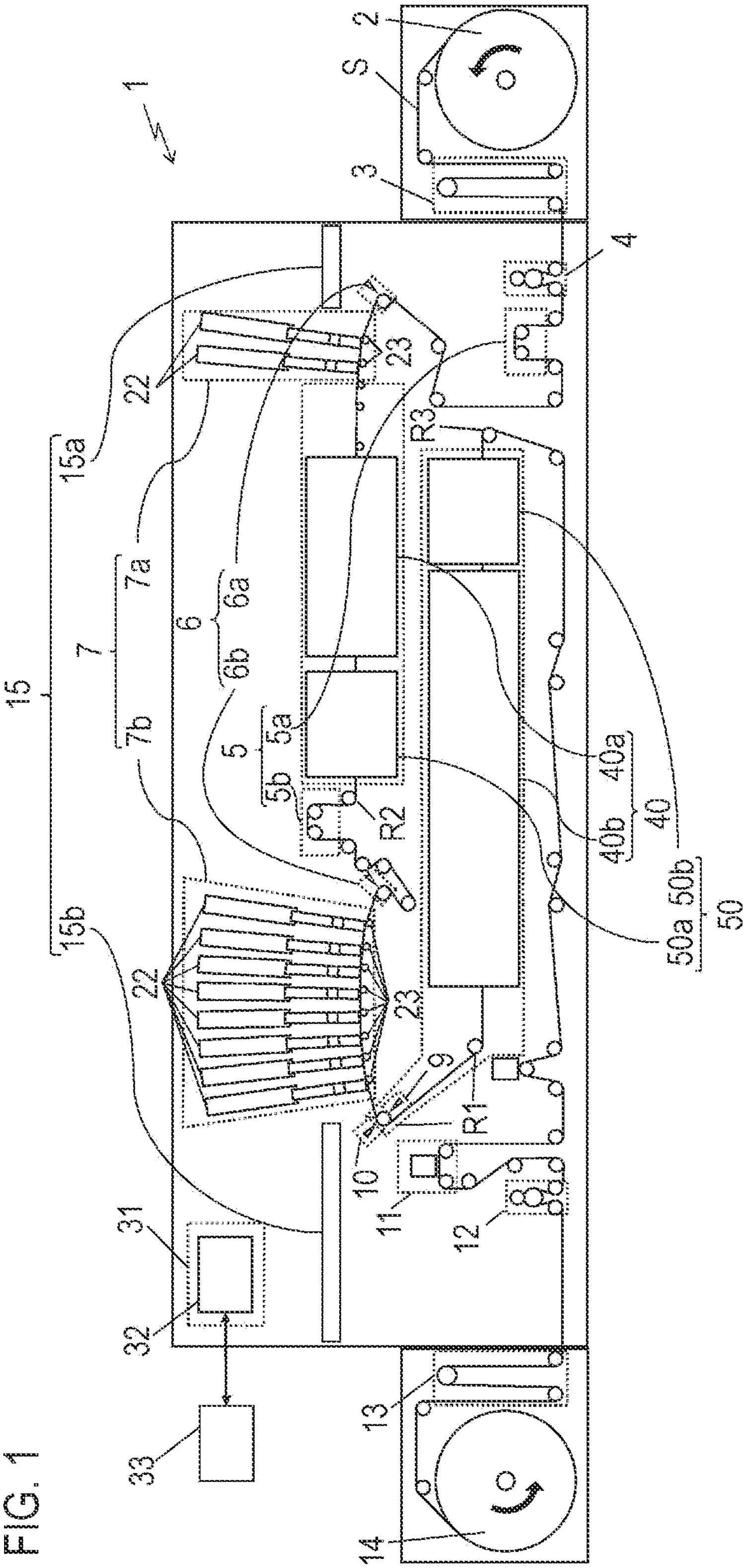
FIG. 1 is a schematic view showing an internal configuration of a recording apparatus according to a first embodiment.

A recording apparatus 1 according to a first embodiment of the present invention will be described. FIG. 1 is a schematic sectional view showing an internal configuration of the recording apparatus 1. The recording apparatus 1 is a high-speed line printer that uses a continuous sheet (hereinafter, a sheet S) of which ends are wound in a roll shape as a recording medium. In the following description, an up-down direction of FIG. 1 will be defined as an up-down direction of the recording apparatus 1, a left-right direction of FIG. 1 will be defined as a left-right direction of the recording apparatus 1, and a depth direction from a near side toward a far side of the paper plane will be defined as a width direction of a sheet. A conveying direction of the sheet in the recording apparatus 1 is a direction that intersects with the width direction of the sheet and is approximately perpendicular to the width direction.

The recording apparatus 1 according to the first embodiment includes an unwinding roll portion 2, a first dancer portion 3, a first main conveying portion 4, a meander correcting portion 5, a conveyance detecting portion 6, and a recording portion 7. The recording apparatus 1 further includes a conveyance tension detecting portion 9, a recorded image position detecting portion 10, a scanner portion 11, a second main conveying portion 12, a second dancer portion 13, a winding roll portion 14, a maintenance portion 15, a drying portion 40, and a cooling portion 50. These units are all arranged inside of the recording apparatus 1. Note that the recording apparatus 1 includes a part of the units described above in plurality. Hereinafter, similar units provided in plurality will be described by adding suffixes to distinguish the units from each other when necessary.

As indicated by a solid line in FIG. 1, the sheet S is conveyed along a sheet conveyance path of the recording apparatus 1 and subjected to processing in each unit. Hereinafter, a direction from the unwinding roll portion 2 that holds one end of the sheet S in a roll shape toward the winding roll portion 14 that holds another end of the sheet S in a roll shape in the conveying direction of the sheet S will be described as a forward direction D1. In addition, a direction that is opposite to the forward direction D1 and that is from the winding roll portion 14 toward the unwinding roll portion 2 in the conveying direction of the sheet S will be described as a backward direction D2. Furthermore, a conveyance in the forward direction D1 of the sheet S will be described as a forward conveyance and a conveyance in the backward direction D2 of the sheet S will be described as a reverse conveyance.

A conveying portion of the recording apparatus 1 is mainly constituted of a plurality of rollers arranged along the sheet conveyance path and is configured to be capable of conveying the sheet S in the forward direction D1 and the backward direction D2. In addition, the recording apparatus 1 conveys the sheet S along the sheet conveyance path to a first recording step portion and a second recording step portion.

The first recording step portion includes a first recording portion 7*a*, a first drying portion 40*a*, and a first cooling portion 50*a* and records and fixes an image on the sheet S. The second recording step portion includes a second recording portion 7*b*, a second drying portion 40*b*, and a second cooling portion 50*b* and records and fixes an image on the sheet S having passed through the first recording step portion. In other words, the recording apparatus 1 is capable of consecutively recording images on the sheet S by causing the sheet S to pass through the first recording step portion and the second recording step portion. In addition, the recording apparatus 1 can selectively determine a recording step in accordance with recording conditions and perform a recording operation of an image on the sheet S using only the selected recording step portion.

The unwinding roll portion 2 is a unit that holds and supplies the sheet S wound in a roll shape. The unwinding roll portion 2 is configured to store an unwinding roll and to pull out and supply the sheet S. Note that the number of rolls that can be stored is not limited to one and a configuration in which two or three or more rolls are stored and the sheet S is selectively pulled out and supplied may be adopted. In addition, the unwinding roll portion 2 is rotationally controlled by a drive motor (not illustrated) so as to be individually capable of rotating a roll forward and rotating a roll backward.

The first dancer portion 3 is a unit that imparts certain tension to the sheet S between the unwinding roll portion 2 and the first main conveying portion 4. In the first dancer portion 3, the tension is imparted to the sheet S by tension imparting means (not illustrated).

The first main conveying portion 4 is a unit that conveys the sheet S along the sheet conveyance path and imparts tension to the sheet S between the first main conveying portion 4 and the second main conveying portion 12. The first main conveying portion 4 includes a roller that rotates by driving a motor (not illustrated) and tensions and conveys the sheet S.

The meander correcting portion 5 is a unit that adjusts a width-direction position of the sheet S and corrects a meander of the sheet S in the width direction when tensioning and conveying the sheet S. As the meander correcting portion 5, the recording apparatus 1 includes a first meander correcting portion 5*a* and a second meander correcting portion 5*b*. The first meander correcting portion 5*a* is positioned on an upstream side in the forward direction of the first recording portion 7*a* on the sheet conveyance path. The second meander correcting portion 5*b* is positioned on an upstream side in the forward direction of the second recording portion 7*b* on the sheet conveyance path and on a downstream side in the forward direction of the first cooling portion 50*a*.

The conveyance detecting portion 6 is a unit that detects a conveying speed of the sheet S and a mark printed on the sheet S in advance in order to control an image formation timing of the recording portion 7. As the conveyance detecting portion 6, the recording apparatus 1 includes a first conveyance detecting portion 6*a* and a second conveyance detecting portion 6*b*. The first conveyance detecting portion 6*a* is positioned on a downstream side in the forward direction of the first meander correcting portion 5*a* on the sheet conveyance path and on an upstream side in the forward direction of the first recording portion 7*a*. The second conveyance detecting portion 6*b* is positioned on a downstream side in the forward direction of the second meander correcting portion 5*b* on the sheet conveyance path and on an upstream side in the forward direction of the second recording portion 7*b*. The first conveyance detecting portion 6*a* and the second conveyance detecting portion 6*b* are respectively used to control an image formation timing in the first recording portion 7*a* and the second recording portion 7*b*.

The recording portion 7 is a sheet processing portion that applies a liquid composition (ink) to the conveyed sheet S from above using a recording head 22 and records (forms) an image onto the sheet S. The sheet conveyance path in the recording portion 7 is formed by a guide roller 23 arranged in an upward-convex arc shape and a clearance with respect to the recording head 22 is secured as certain tension is imparted to the sheet S. In the recording portion 7, a plurality of recording heads 22 are arranged along the sheet conveyance path. Each recording head 22 according to the first embodiment is a line recording head.

As the recording portion 7, the recording apparatus 1 includes the first recording portion 7*a* and the second recording portion 7*b*. The first recording portion 7*a* and the second recording portion 7*b* are arranged at positions separated from each other and the second recording portion 7*b* is positioned on a downstream side in the forward direction D1 with respect to the first recording portion 7*a*. The first recording portion 7*a* includes a total of two recording heads 22 that correspond to W (white) ink and a reaction liquid. The second recording portion 7*b* includes a total of eight recording heads 22 that correspond to the reaction liquid and three spot colors in addition to the four colors of Bk (black), Y (yellow), M (magenta), and C (cyan). The inks are respectively supplied to the recording heads 22 via ink tubes from ink tanks (not illustrated).

A reaction liquid refers to a liquid containing a component that increases viscosity of ink. In this case, increasing the viscosity of an ink refers to a state where, due to a color material, a resin, or the like constituting the ink coming into contact with the component that increases viscosity of the ink, a chemical reaction or a physical adsorption occurs and a rise in ink viscosity is exhibited. Increasing the viscosity of an ink is not limited to an increase in the viscosity of the entire ink but also includes a local increase in the viscosity due to a partial agglomeration of a component constituting the ink such as a color material or a resin. The component that increases the viscosity of an ink is not particularly limited and may be metal ions or a polymeric flocculant. As the component that increases the viscosity of an ink, for example, a substance that causes a change in pH of the ink and agglomerates the color material in the ink can be used and, to this end, an organic acid can be used.

By applying the reaction liquid before an ink is applied to the sheet S, the ink having reached the sheet S can be immediately fixed onto the sheet S. Accordingly, bleeding in which adjacent inks mix with each other can be suppressed. When applying the present invention, the types of colors, the number of colors, and the number of the recording heads 22 are not limited to those in the configuration described above. In addition, as an inkjet method, a method using an exothermic element, a method using a piezoelectric element, a method using an electrostatic element, a method using a MEMS element, and the like can be adopted.

Figure 2:
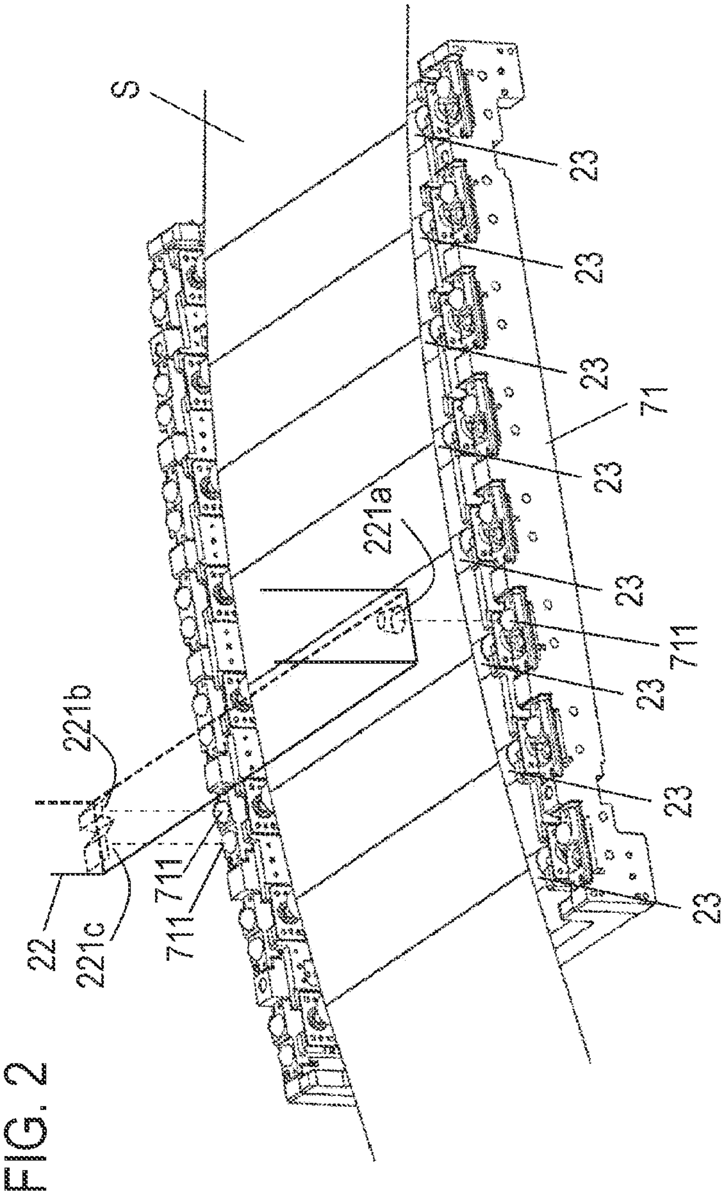
FIG. 2 is a perspective view of a conveying portion housing of a recording portion according to the first embodiment.

The recording portion 7 includes a conveying portion housing 71 provided with a plurality of positioning members 711 for positioning the recording heads 22. FIG. 2 is a perspective view showing details of the conveying portion housing 71 of the recording portion 7. The positioning members 711 are provided with respect to each of the recording heads 22 so as to sandwich the sheet S in the width direction of the sheet S so that one positioning member 711 is provided on one side of the sheet S and two positioning members 711 are provided on the other side. In addition, the recording head 22 is provided with positioned portions 221*a*, 221*b*, and 221*c* that correspond to the positioning member 711.

Figure 3:
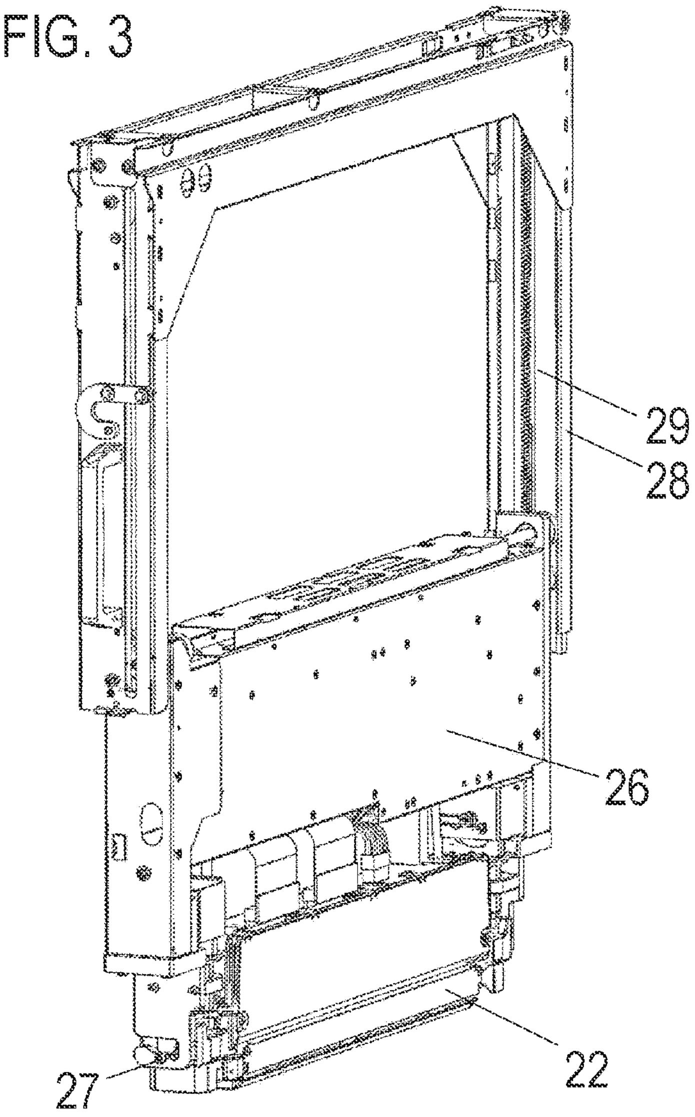
FIG. 3 is a perspective view of a recording head lifting/lowering mechanism according to the first embodiment.

The recording heads 22 are arranged so as to oppose a recording surface of the sheet S and configured to be capable of approaching and separating from the sheet S. FIG. 3 is a diagram showing a lifting/lowering mechanism of the recording head 22. As shown in FIG. 3, the recording head 22 includes a recording head support shaft 27 and is rotatably supported by a recording head holding portion 26 for holding and lifting and lowering the recording head 22 upward and downward so as to support the recording head support shaft 27 from below. The recording head holding portion 26 performs lifting and lowering operations upward and downward along a lifting/lowering rail 29 provided in a recording head lifting/lowering frame 28 by a driving mechanism (not illustrated) provided inside of the recording head holding portion 26. While ink is applied onto the sheet S using the recording head 22 that is an inkjet head in the first embodiment, a method of applying ink onto the sheet in the recording portion 7 is not limited thereto. For example, the reaction liquid may be applied to the sheet S by a roller, a die coating apparatus (die coater), a blade coating apparatus (blade coater), or the like instead of the recording head 22.

The conveyance tension detecting portion 9 is a unit that detects tension imparted to the sheet S when tensioning and conveying the sheet S between the first main conveying portion 4 and the second main conveying portion 12. The recorded image position detecting portion 10 is a unit that detects a displacement of an image formed on the sheet S in the recording portion 7 during a recording operation and causes the displacement of the image to be corrected. In the first embodiment, the conveyance tension detecting portion 9 and the recorded image position detecting portion 10 are positioned on a downstream side in the forward direction of the first recording portion 7*a* and the first drying portion 40*a* and on an upstream side in the forward direction of the second recording portion 7*b* and the second drying portion 40*b*.

The drying portion 40 is a unit that reduces a liquid component included in a liquid composition applied onto the sheet S in the recording portion 7 and that increases fixing performance between the sheet S and the ink. As the drying portion 40, the recording apparatus 1 includes the first drying portion 40*a* and the second drying portion 40*b*. The first drying portion 40*a* is positioned on a downstream side in the forward direction of the first recording portion 7*a* on the sheet conveyance path. The second drying portion 40*b* is positioned on a downstream side in the forward direction of the second recording portion 7*b* on the sheet conveyance path.

The drying portion 40 blows air to the sheet S on which an image has been recorded and dries the applied ink. Inside of the drying portion 40, with respect to a passing sheet S, air is at least applied from a side of an ink-applied surface of the sheet S to dry the ink-applied surface of the sheet S. As a drying method, besides the method of applying air, a method of irradiating a surface of the sheet S with electromagnetic waves (ultraviolet rays, infrared rays, or the like) or a conductive heat transfer method of bringing a heating element into contact with the sheet S may be adopted or a configuration of applying a combination of these methods may be adopted.

The cooling portion 50 is a unit that cools the sheet S having been fixed by the drying portion 40 and solidifies softened ink, and suppresses an amount of temperature change of the sheet S in downstream steps of the recording apparatus 1. As the cooling portion 50, the recording apparatus 1 includes the first cooling portion 50*a* and the second cooling portion 50*b*. The first cooling portion 50*a* is positioned on a downstream side in the forward direction of the first drying portion 40*a* on the sheet conveyance path. The second cooling portion 50*b* is positioned on a downstream side in the forward direction of the second drying portion 40*b* on the sheet conveyance path.

Inside the cooling portion 50, with respect to a passing sheet S, air with a lower temperature than the sheet S is at least applied from the side of the ink-applied surface of the sheet S to cool the ink-applied surface of the sheet S. As a cooling method, a conductive heat transfer method of bringing a heat radiating member into contact with the sheet S may be adopted in addition to the method of applying air or a combination of the methods may be adopted.

The scanner portion 11 is a unit that reads a test image formed on the sheet S in the recording portion 7 prior to final printing, detects a displacement or a concentration of the image, and causes a correction to be made for the final printing. The scanner portion 11 is positioned on a downstream side in the forward direction of the second cooling portion 50*b* on the sheet conveyance path.

The second main conveying portion 12 is a unit that conveys the sheet S while imparting tension to the sheet S together with the first main conveying portion 4 and that adjusts the tension of the sheet S. The second main conveying portion 12 includes a roller that rotates by being driven by a motor (not illustrated) and controls a roller speed with a tension control portion (not illustrated) according to a tension value detected by the conveyance tension detecting portion 9.

As an additional configuration for adjusting the tension of the sheet S, a configuration in which tension of the sheet S is adjusted by a clutch (not illustrated) capable of controlling a torque coupled to the drive may be added to the recording apparatus 1. In this case, as a tension control method, the two methods of a torque control method of controlling a torque value transmitted from the clutch and a speed control method of controlling a roller speed of the second main conveying portion 12 become usable. In a preferable configuration, the two tension control methods can be switched from one method to the other depending on the purpose of tension control or the two methods can be used at the same time.

The second dancer portion 13 is a unit that imparts certain sheet tension between the second main conveying portion 12 and the winding roll portion 14. In the second dancer portion 13, tension is imparted to the sheet S by tension imparting means (not illustrated).

The winding roll portion 14 is a unit that winds up the sheet S having been subjected to recording processing around a winding core. Note that the number of rolls that can be collected is not limited to one and a configuration in which two or three or more winding cores are provided and the sheet S is collected using a selectively switched winding core may be adopted. The winding roll portion 14 is rotationally controlled by a drive motor so as to be individually capable of rotating a roll forward and rotating a roll backward.

By controlling the respective drive motors of the unwinding roll portion 2 and the winding roll portion 14 so as to rotate forward or rotate backward, the sheet S is conveyed in the forward direction D1 and in the backward direction D2. Even in the case of reverse conveyance, tensioning and conveyance are performed between the first main conveying portion 4 and the second main conveying portion 12 in a similar manner to forward conveyance. Depending on contents of processing after recording, a configuration of cutting a continuous sheet using a cutter and stacking cut sheets S may be adopted instead of a configuration of winding up the sheet S around a winding core.

A control portion 31 is a unit responsible for controlling the respective portions of the entire recording apparatus 1. The control portion 31 includes a CPU, a storage apparatus, a controller including various control portions, an external interface, and an operating portion 32 that is used by a user to perform input and output. Operations of the recording apparatus 1 are controlled by the control portion 31 based on commands from the controller or from a host apparatus 33 such as a host computer that is connected to the controller via the external interface.

The maintenance portion 15 is a unit that includes a mechanism for recovering a discharge performance of the recording head 22. As the recovery mechanism of the recording head 22, for example, a cap mechanism for protecting an ink discharge surface of the recording head 22, a wiper mechanism for wiping the ink discharge surface, or a suction mechanism for sucking the ink inside of the recording head 22 using negative pressure from the ink discharge surface can be adopted. In addition, the maintenance portion 15 includes a driving mechanism and a rail (both not illustrated) and is capable of reciprocating in a horizontal direction along the rail. The maintenance portion 15 moves to directly under the recording head 22 during maintenance of the recording head 22 and moves to a position at a distance from directly under the recording head 22 when a maintenance operation is not being performed. The maintenance portion 15 includes a first maintenance portion 15*a* corresponding to the first recording portion 7*a* and a second maintenance portion 15*b* corresponding to the second recording portion 7*b*.

The conveying portion of the recording apparatus 1 includes a plurality of guide rollers. A winding guide roller R1 is a roller that is positioned on a downstream side in the forward direction of the second recording portion 7*b* and that winds a surface on an opposite side to the ink-applied surface of the sheet S at a certain winding angle. Two winding guide rollers R1 are arranged between the second recording portion 7*b* and the second drying portion 40*b* on the sheet conveyance path and the sheet S is conveyed so as to be folded back approximately parallelly. One of the winding guide rollers R1 is positioned at approximately the same height as the second recording portion 7*b* and the other winding guide roller R1 is positioned at approximately the same height as the second drying portion 40*b* and positioned lower than the second recording portion 7*b*.

A winding guide roller R2 is a roller that is positioned between the first cooling portion 50*a* and the second meander correcting portion 5*b* on the sheet conveyance path and that winds a surface on an opposite side to the ink-applied surface of the sheet S at a certain winding angle. The winding guide roller R2 guides the sheet S having passed the first cooling portion 50*a* upward toward the second meander correcting portion 5*b*.

A winding guide roller R3 is a roller that is positioned on a downstream side in the forward direction D1 of the second cooling portion 50*b* on the sheet conveyance path and that winds a surface on an opposite side to the ink-applied surface of the sheet S at a certain winding angle. The winding guide roller R3 guides the sheet S having passed the second cooling portion 50*b* downward.

Mechanism of Meander of Sheet S and Effect Thereof

Next, a mechanism of a meander of the sheet S that may occur in the recording apparatus 1 and an effect thereof will be described. The sheet S is conveyed at high speed by being spanned across a group of rollers of the conveying portion that constitutes the sheet conveyance path shown in FIG. 1. At this point, the sheet S is in contact with a roller so as to basically press the roller by tension alone. Therefore, when the sheet S is subjected to a deflecting force in the width direction due to a convolution of air, a variation in conveyance tension, or a misalignment between rollers, a so-called meander in which the sheet S travels at a position that deviates from a predetermined sheet conveyance path may occur. When an image is formed on a meandering sheet S, an image formation position in the width direction changes and significantly impairs the appearance of the image in a product. For this reason, the recording apparatus 1 according to the first embodiment includes the meander correcting portion 5 that corrects a meandering sheet S so as to return to a predetermined conveyance position.

Configuration and Control of Meander Correcting Portion

Figure 4B:
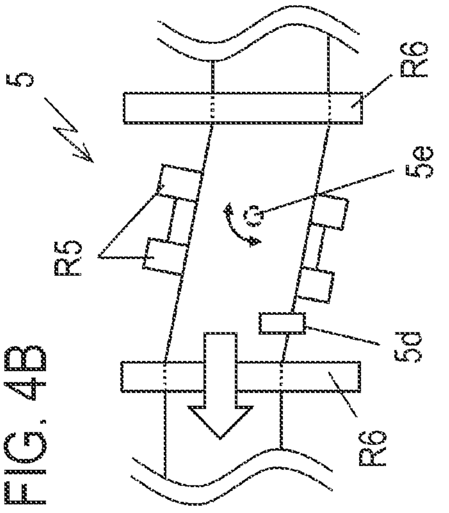
FIGS. 4A and 4B are schematic views showing a configuration of a meander correcting portion according to the first embodiment.
Figure 4A:
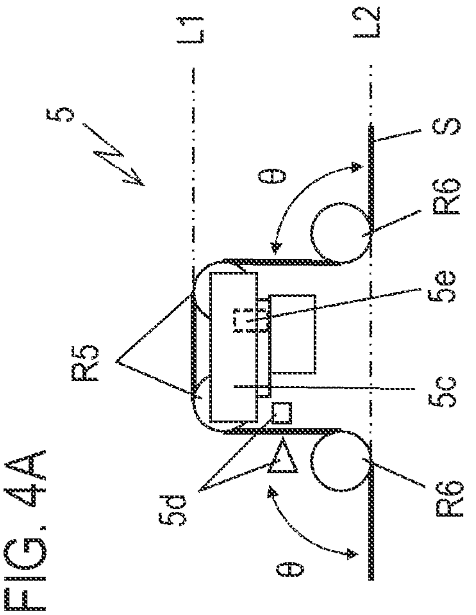

Next, the configuration of the meander correcting portion 5 according to the present embodiment will be described in greater detail with reference to FIGS. 4A and 4B. FIG. 4A is a schematic sectional view of the meander correcting portion 5 as viewed from the width direction of the sheet S and shows a configuration of the meander correcting portion 5. FIG. 4B is a schematic top view of the meander correcting portion 5. Note that the first meander correcting portion 5*a* and the second meander correcting portion 5*b* are configured in a similar manner.

The meander correcting portion 5 is a position adjustment portion that adjusts the width-direction position of the sheet S on an upstream side of the forward direction D1 of the recording portion 7. The meander correcting portion 5 includes a holding frame 5*c* that holds two meander correcting rollers R5, a detection sensor 5*d* that detects a conveyance position in the width direction of the sheet S, and a rotating shaft 5*e* that rotatably supports the holding frame 5*c*. The meander correcting portion 5 adjusts the width-direction position of the sheet S while conveying the sheet S with the meander correcting rollers R5 and corrects a positional displacement with respect to an ideal position. The holding frame 5*c* is rotatable around a rotational axis that is perpendicular to a rotational axis direction of the meander correcting rollers R5. The conveying position in the width direction of the sheet S is adjusted by rotating the holding frame 5*c* so as to tilt with respect to the conveying direction of the sheet S in a state where the meander correcting rollers R5 convey the sheet S. The meander correcting portion 5 can adjust the width-direction position of the sheet S by sequentially rotating the holding frame 5*c* while detecting the width-direction position of the sheet S with the detection sensor 5*d*.

Driven rollers R6 are respectively arranged on an upstream side and a downstream side in the forward direction D1 of the meander correcting rollers R5. The meander correcting rollers R5 and the driven rollers R6 are arranged so that a tangent line L1 connecting the two meander correcting rollers R5 to each other and a tangent line L2 connecting the two driven rollers R6 to each other are approximately parallel and that a winding angle θ of the driven rollers R6 is approximately 90°.

Adopting such an arrangement and a configuration secures a position adjustment capability of the meander correcting portion 5 and reduces a risk of an occurrence of wrinkles of the sheet S.

The detection sensor 5*d* is a sensor that detects a conveying position in the width direction of the sheet S by measuring a position of one end (hereinafter, referred to as a side end) in the width direction of the sheet S using an ultrasonic sensor. As the detection sensor 5*d*, an optical sensor such as a fiber sensor or an optical camera that measures a reference position of a printed recording pattern may be used. In other words, when applying the present invention, a position detection method is not limited to a method using an ultrasonic sensor.

The detection sensor 5*d* is desirably arranged on a downstream side in the forward direction of the meander correcting portion 5. In the first embodiment, the detection sensor 5*d* is arranged between the meander correcting roller R5 positioned on the downstream side in the forward direction among the two meander correcting rollers R5 and the driven roller R6 positioned on the downstream side in the forward direction with respect to the meander correcting roller R5. In the meander correcting portion 5, when the detection sensor 5*d* detects the side end position of the sheet S, a phase of the holding frame 5*c* is changed so that the side end position of the sheet S assumes an ideal position. When the sheet S is conveyed in a state where the holding frame 5*c* is rotated, the sheet S becomes twisted between the meander correcting roller R5 and the driven roller R6 and the side end position of the sheet S is gradually adjusted to the ideal position.

Pre-Reprinting Step (Position Adjustment Operation)

Next, the pre-reprinting step that is performed in order to adjust a position of the sheet S prior to reprinting in the first embodiment will be described. In the first embodiment, the control portion 31 is configured to be capable of executing a position adjustment operation as a sheet position adjustment method in the pre-reprinting step following a first recording operation and subsequently executing a second recording operation. In this case, the first recording operation and the second recording operation respectively include image recording by the recording portion 7, drying by the drying portion 40, and cooling by the cooling portion 50. FIGS. 5A and 5B to 9A and 9B show an operation example of the recording apparatus 1 that is executed by the control portion 31 in an order of the first recording operation (print processing), the position adjustment operation, and the second recording operation (reprint processing). The drawings show a rotation direction of main rollers in the operation of the recording apparatus 1 by arrows.

Figure 5A:
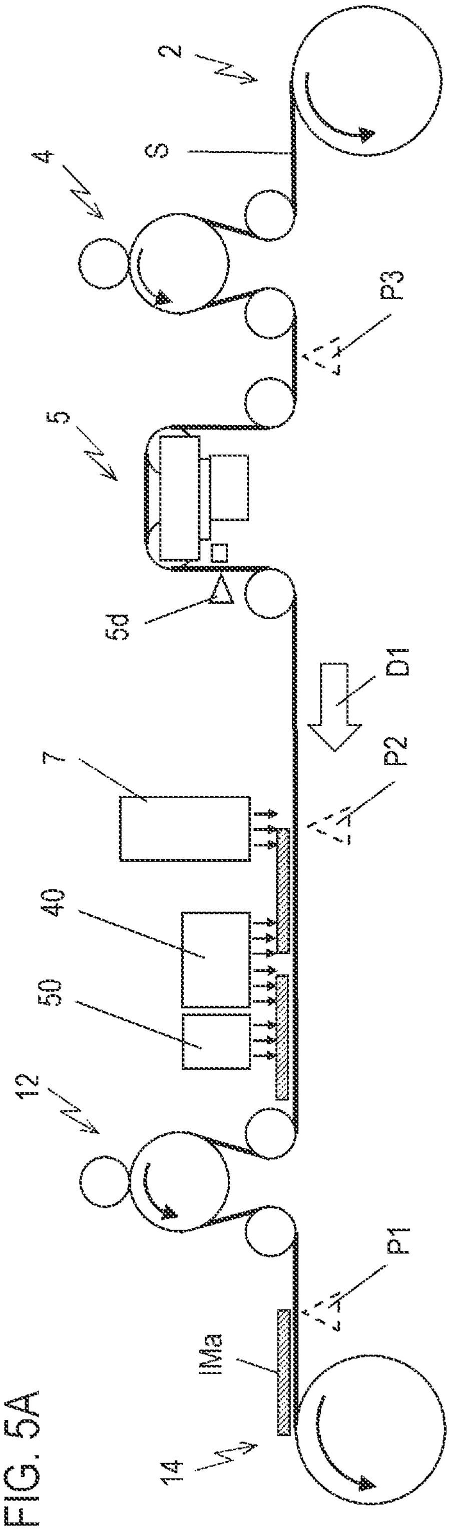
FIGS. 5A and 5B are diagrams showing a situation of a sheet during a first recording operation according to the first embodiment.
Figure 5B:
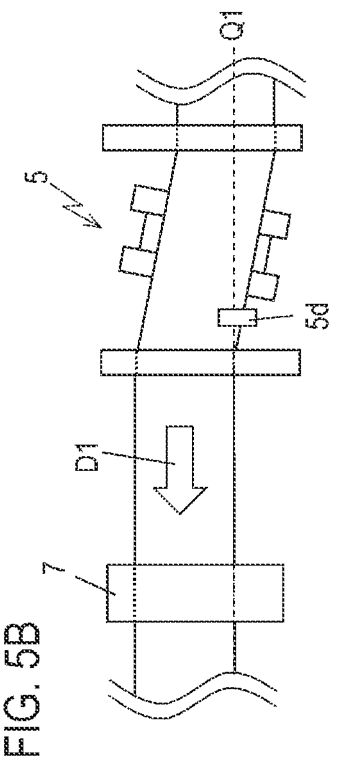

First, as the first recording operation, an operation of the recording apparatus 1 when predetermined print processing is executed with respect to the sheet S is executed will be described. FIG. 5A is a schematic sectional view showing a main configuration of the recording apparatus 1. FIG. 5A shows a situation where the first recording operation is being executed. FIG. 5B is a schematic top view of the meander correcting portion 5 in the state shown in FIG. 5A. In the first recording operation, an image IMa is recorded onto the sheet S in the recording portion 7 while the sheet S is being conveyed in the forward direction D1 and the image IMa is fixed onto the sheet S by passing through the drying portion 40 and the cooling portion 50. In addition, the sheet S is conveyed so that the image IMa having passed through the cooling portion 50 moves to a first stop position P1 of the winding roll portion 14. At this point, as shown in FIG. 5A, the control portion 31 conveys the sheet S by controlling the conveying portion so that a back end in the forward direction D1 of the image IMa is positioned at the first stop position P1.

In the first recording operation, a meander of the sheet S is corrected in the meander correcting portion 5. At this point, as shown in FIG. 5B, the meander correcting portion 5 adjusts the width-direction position of the sheet S so that a position of the side end of the sheet S in the recording portion 7 equals a target side end position Q1. In other words, the target side end position Q1 is a target position (ideal position) in the width direction in a recording operation of the sheet S.

Figure 6A:
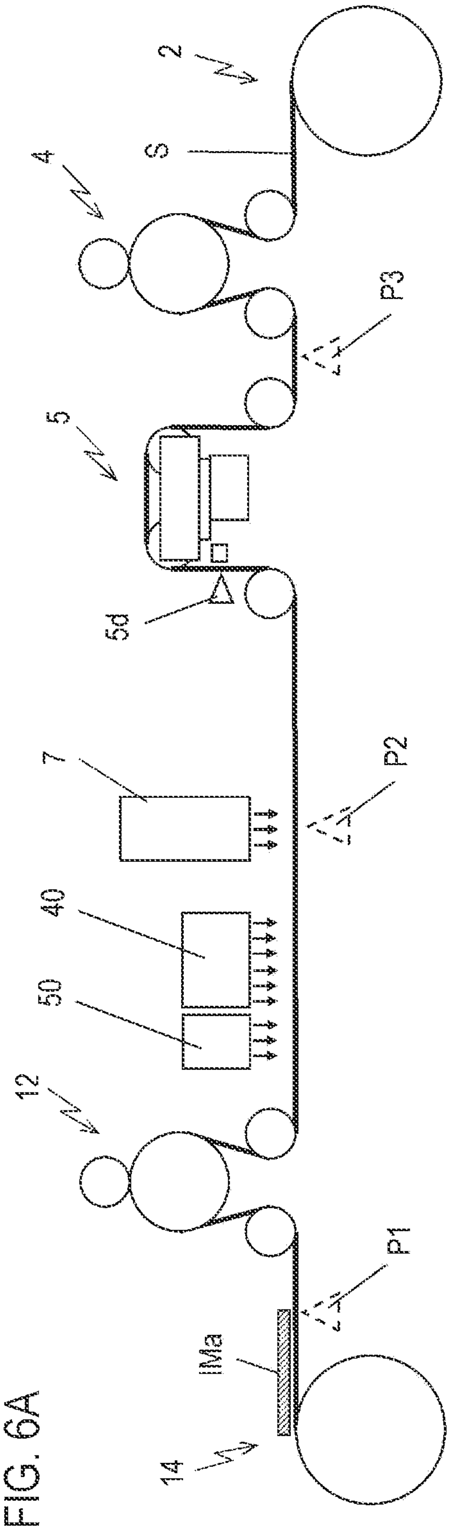
FIGS. 6A and 6B are diagrams showing a situation of a sheet after an end of the first recording operation according to the first embodiment.
Figure 6B:
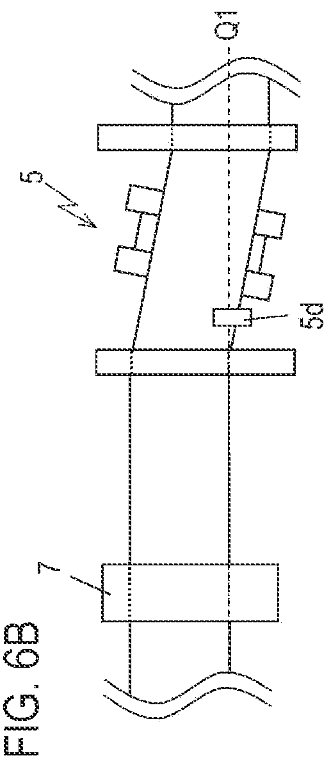

Next, a state of the recording apparatus 1 after the end of the first recording operation will be described. FIG. 6A is a schematic sectional view showing a main configuration of the recording apparatus 1. FIG. 6A shows a situation after the end of the first recording operation. FIG. 6B is a schematic top view of the meander correcting portion 5 in the state shown in FIG. 6A. At this point, conveyance of the sheet S is stopped in a state where the back end in the forward direction D1 of the image IMa is positioned at the first stop position P1. At this point, a region of the sheet S that is positioned between the first stop position P1 and a recording position is a blank region where an image is not formed. In addition, in the recording portion 7, the side end of the sheet S is positioned at the target side end position Q1 in a similar manner to during the first recording operation. When a next recording operation is started in this state, the blank region between the first stop position P1 and the recording position becomes a wasted paper region. In particular, when a recording operation is repetitively and intermittently executed on the same sheet S, the wasted paper region increases. In consideration thereof, in the first embodiment, the pre-reprinting step is executed in order to reduce the wasted paper region before the next recording operation is started.

While the first stop position P1 is set in a vicinity of the winding roll portion 14 in the first embodiment, when applying the present invention, the first stop position P1 is not limited to such a configuration. For example, the first stop position P1 may be set on a splicing table (not illustrated) instead of the winding roll portion 14. In addition, the first stop position P1 may be switchable between during test pattern printing and during normal printing.

Next, the position adjustment operation that is executed following the first recording operation will be described in detail. In the position adjustment operation, after conveyance (reverse conveyance) in the backward direction D2 of the sheet S is performed, conveyance (forward conveyance) in the forward direction D1 is performed.

Figure 7A:
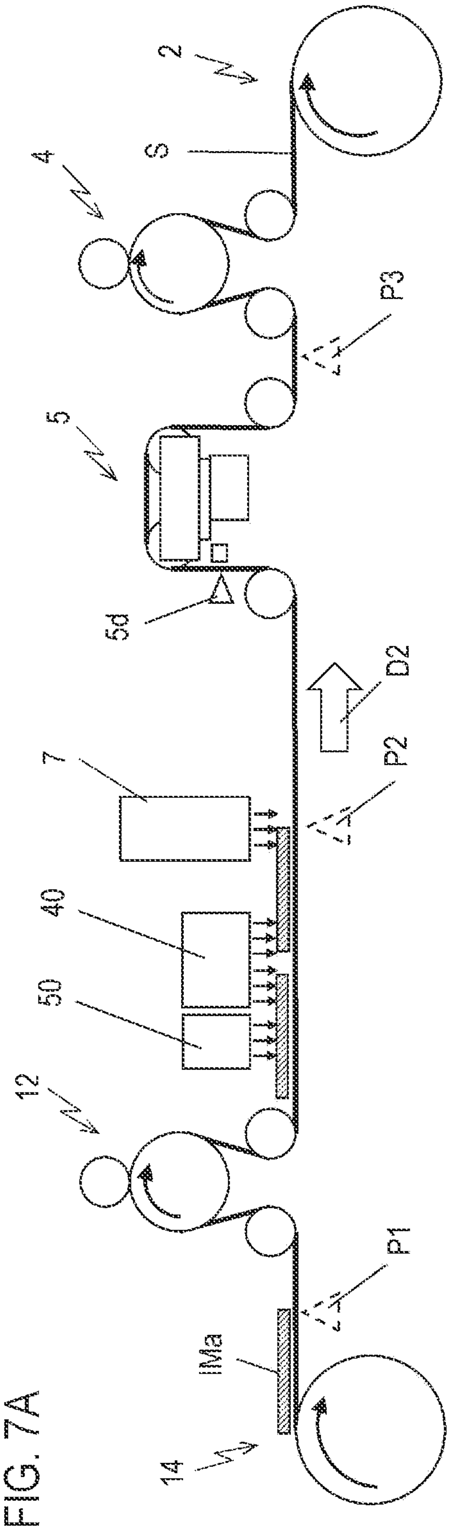
FIGS. 7A and 7B are schematic sectional views showing a situation of a sheet during a reverse conveyance according to the first embodiment.
Figure 7B:
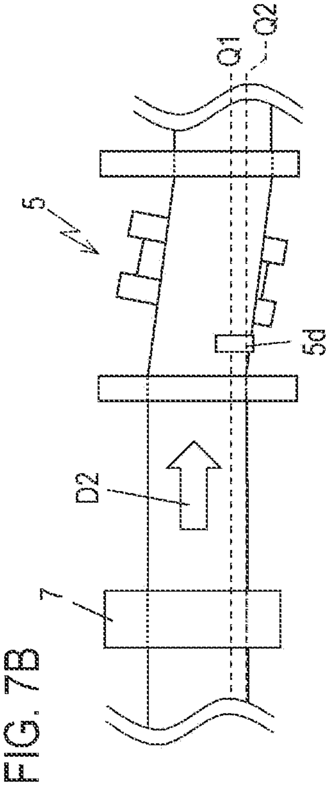

In the position adjustment operation, first, the sheet S is conveyed in the backward direction D2. FIG. 7A is a schematic sectional view showing a main configuration of the recording apparatus 1. FIG. 7A shows a situation where the position adjustment operation is started and the sheet S is conveyed in reverse. FIG. 7B is a schematic top view of the meander correcting portion 5 in the state shown in FIG. 7A. FIGS. 7A and 7B show a situation where the sheet S has been conveyed in reverse and moved to a second stop position P2. In the present operation example, the second stop position P2 is a position in a vicinity of the recording position in the recording portion 7. In other words, when the sheet S is conveyed in reverse from the state shown in FIG. 6A to the state shown in FIG. 7A, the rear end in the forward direction D1 of the image IMa on the sheet S is positioned in a vicinity of a recording start position.

When a next recording operation (reprint) is started in the state shown in FIG. 7A, an image can be recorded adjacent to the rear end in the forward direction D1 of the image IMa in a longitudinal direction of the sheet S (conveying direction). Therefore, by conveying the sheet S in reverse after the end of the first recording operation so that the image IMa recorded on the sheet S in the first recording operation returns to the recording portion 7, an increase in the wasted paper region of the sheet S can be suppressed. A conveying distance of the sheet S at this point or, in other words, a distance from the first stop position P1 to the second stop position P2 will be referred to as a first conveying distance U1.

However, in the first embodiment, during a reverse conveyance of the sheet S, the holding frame 5*c* of the meander correcting portion 5 does not rotate and is stopped while maintaining a turn angle during the first recording operation. This is done in order to prevent a situation where the holding frame 5*c* is rotated during a reverse conveyance, causing a feed direction of the meander correcting rollers R5 to suddenly change with respect to the conveying direction of the sheet S and causing an occurrence of wrinkles of the sheet S. In other words, since an adjustment of the width-direction position of the sheet S by the meander correcting portion 5 is not performed during a reverse conveyance, there is a risk that the sheet S may meander if the sheet S is conveyed to the second stop position P2.

FIG. 7B shows a situation where, due to a reverse conveyance of the sheet S, the side end of the sheet S in the recording portion 7 is not at the target side end position Q1 but positioned in a displaced manner at a side end position Q2. When a next second recording operation is executed in this state, an image IMb ends up being recorded at a position that is displaced from an ideal position on the sheet S in the width direction. Note that the position of the sheet S shown in FIG. 7B represents an example of a case where the sheet S has meandered during a reverse conveyance and does not indicate a specific position where the sheet S is expected to be present when the sheet S actually meanders.

Figure 11A:
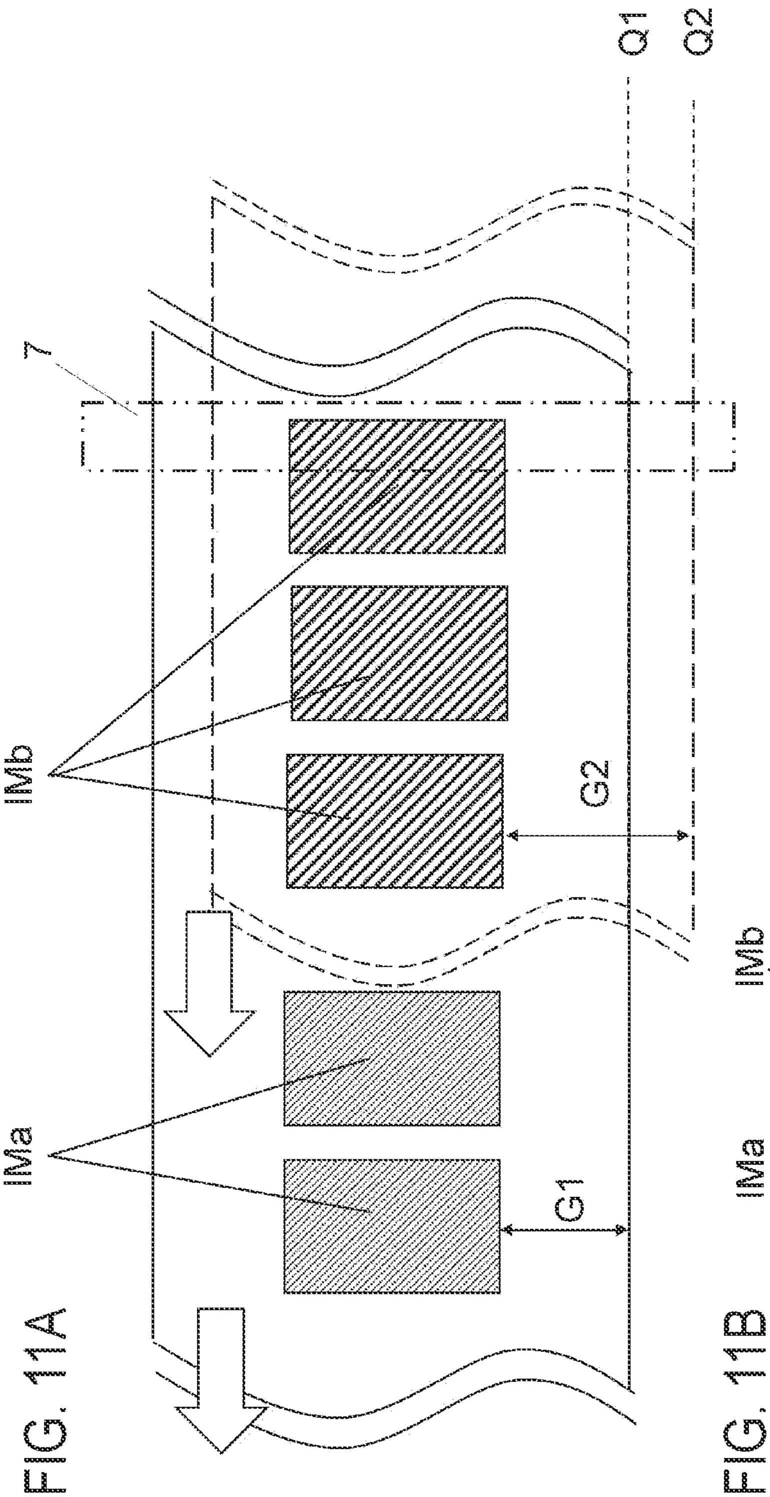
FIGS. 11A and 11B are diagrams showing a situation where the second recording operation has been executed on a meandering sheet.
Figure 11B:
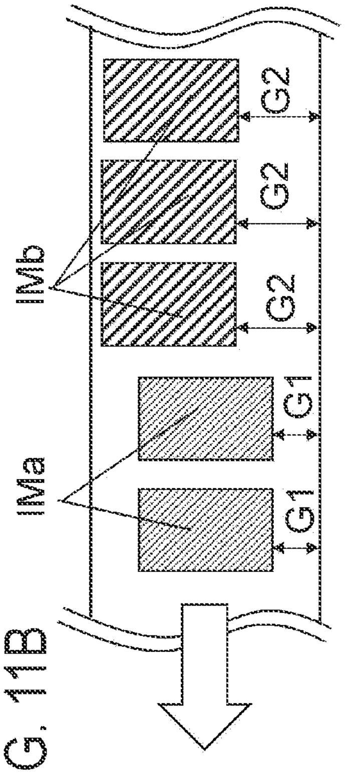

FIGS. 11A and 11B show a situation where the image IMb is recorded at a position that is displaced in the width direction from an ideal position on the sheet S. FIG. 11A is a top view that shows the sheet S as viewed from a side of the ink-applied surface and that shows relative positions of the sheet S with respect to the recording portion 7 during the first recording operation and the second recording operation. In FIG. 11A, the sheet S during the first recording operation is indicated by a solid line and the sheet S during the second recording operation is indicated by a dotted line. In addition, FIG. 11B is a top view that shows, as viewed from a side of the ink-applied surface, the sheet S on which the image IMa and the image IMb have been formed after the end of the first recording operation and the end of the second recording operation.

In the first recording operation, since a meander of the sheet S has been corrected by the meander correcting portion 5, the side end of the sheet S is positioned at the target side end position Q1 and the image IMa is recorded at a location that is separated by a gap G1 from the side end of the sheet S. On the other hand, in the second recording operation, when the second recording operation is executed in the state shown in FIGS. 7A and 7B, the side end of the sheet S is positioned at the side end position Q2 that is displaced from the target side end position Q1 and the image IMb is recorded at a location separated by a gap G2 that differs from the gap G1 from the side end of the sheet S. In addition, the image IMb is recorded on the sheet S in a state of being displaced from the ideal position in the width direction and the width-direction positions of the image IMa and the image IMb end up being changed.

In consideration thereof, in the first embodiment, the position adjustment operation after the first recording operation is completed and before the second recording operation is started is executed so that not only the position of the sheet S in the longitudinal direction but the width-direction position is also adjusted in order to reduce the wasted paper region and to suppress a decline in the appearance of the image. Specifically, in order to correct a meander of the sheet S in the position adjustment operation in the pre-reprinting step, the control portion 31 controls the sheet S to be conveyed in the backward direction D2 so as to enable a conveyance length of conveying the sheet S in the forward direction D1 to be secured. In addition, in the first embodiment, the sheet S is continued to be conveyed in reverse even after the image IMa reaches the second stop position P2 and the sheet S is subsequently conveyed forward while having its meander corrected.

Figure 8A:
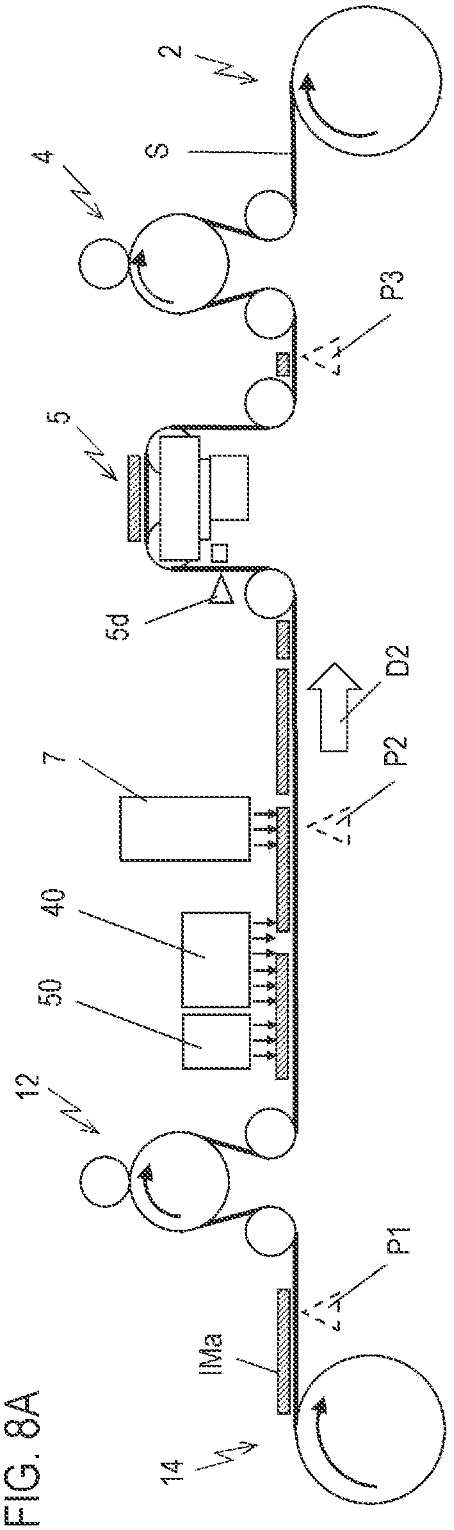
FIGS. 8A and 8B are schematic sectional views showing a situation of a sheet after an end of a reverse conveyance according to the first embodiment.
Figure 8B:
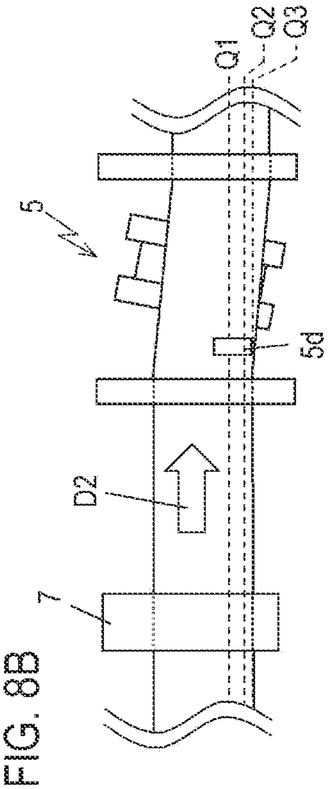

An operation in which the sheet S is further conveyed in the backward direction D2 from the state shown in FIG. 7A in the position adjustment operation will be described. FIG. 8A is a schematic sectional view showing a main configuration of the recording apparatus 1. FIG. 8A shows a situation where the sheet S has been further conveyed in reverse and the image IMa has reached a third stop position P3. The third stop position P3 is a position on an upstream side (side of the unwinding roll portion 2) in the forward direction D1 of the meander correcting portion 5. FIG. 8B is a schematic top view of the meander correcting portion 5 in the state shown in FIG. 8A. Hereinafter, a distance from the second stop position P2 to the third stop position P3 will be referred to as a second conveying distance U2.

The second conveying distance U2 is a conveying distance that is required by the meander correcting portion 5 to adjust the side end position of the sheet S at the recording position to the target side end position Q1 when conveying the sheet S forward. In the first embodiment, the second conveying distance U2 is calculated on the basis of a result of detection of the side end position of the sheet S by the detection sensor 5*d*. Details of a method of calculating the second conveying distance U2 will be provided later. In addition, the meander of the sheet S further increases by having the sheet S conveyed in reverse from the state shown in FIGS. 7A and 7B. As shown in FIG. 8B, due to the sheet S being conveyed in reverse by a distance obtained by adding up the first conveying distance U1 and the second conveying distance U2, the side end of the sheet S is positioned at a side end position Q3 with a larger amount of displacement than the side end position Q2.

Figure 9A:
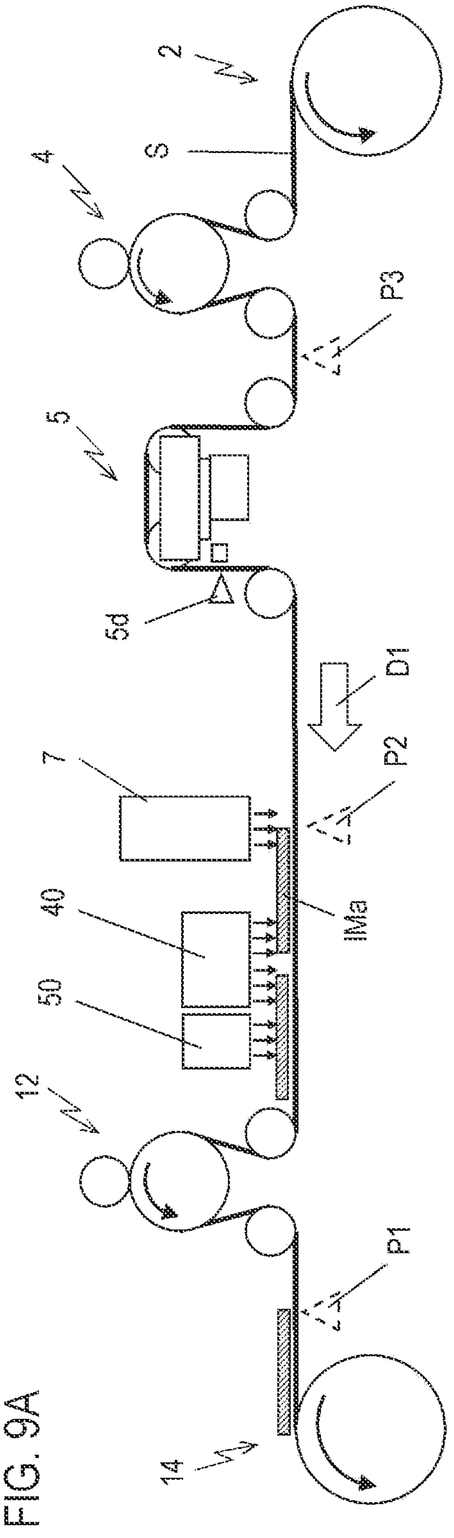
FIGS. 9A and 9B are diagrams showing a situation of a sheet after an end of a position adjustment operation according to the first embodiment.
Figure 9B:
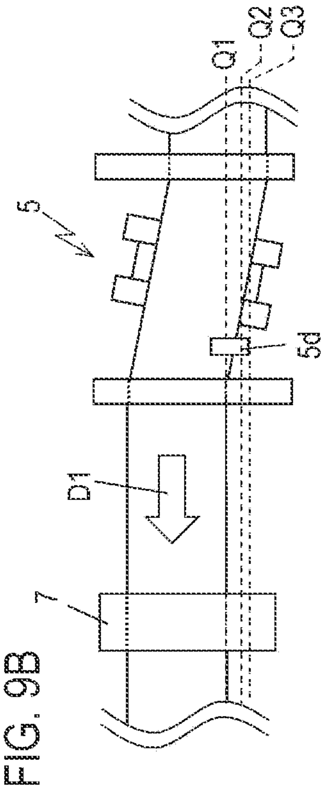
Figure 10A:
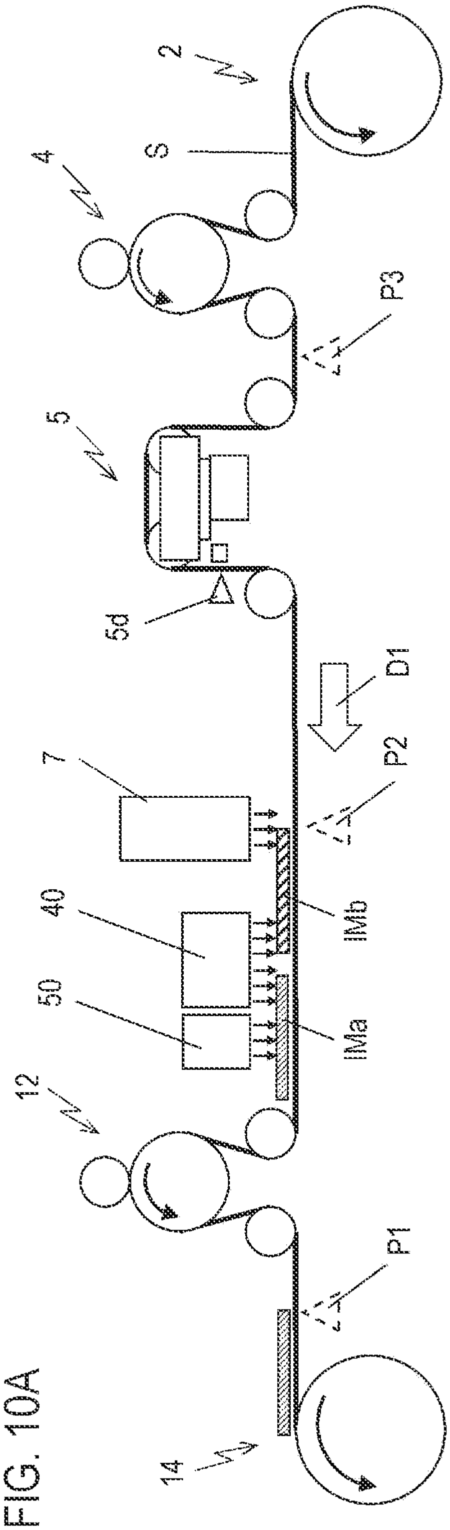
FIGS. 10A and 10B are diagrams showing a situation of a sheet during a second recording operation according to the first embodiment.
Figure 10B:
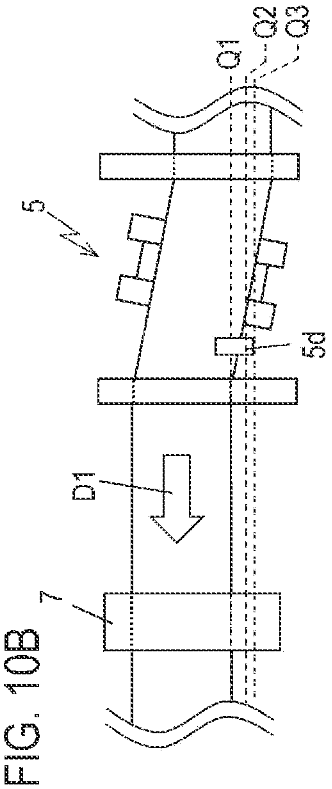

Next, an operation in which the sheet S is conveyed forward from the state shown in FIG. 8A (after the reverse conveyance is completed) will be described. FIG. 9A is a schematic sectional view showing a main configuration of the recording apparatus 1. FIG. 9A shows a situation where the sheet S has been conveyed forward and the position adjustment operation has been completed. FIG. 9B is a schematic top view of the meander correcting portion 5 in the state shown in FIG. 9A. In the position adjustment operation, the sheet S is conveyed in the forward direction D1 so that after the rear end in the forward direction D1 of the image IMa reaches the third stop position P3, the rear end in the forward direction D1 of the image IMa moves to the second stop position P2. In addition, during the forward conveyance of the sheet S, an adjustment of the width-direction position of the sheet S is performed by the meander correcting portion 5 so that the side end of the sheet S is positioned at the target side end position Q1. Furthermore, once the rear end in the forward direction D1 of the image IMa on the sheet S is positioned at the second stop position P2 and the side end of the sheet S is positioned at the target side end position Q1, the position adjustment operation is completed.

Once the position adjustment operation is completed, the second recording operation is next executed. Since the position of the sheet S in the conveying direction has been adjusted by the position adjustment operation, when the second recording operation is executed, a new image IMb is recorded on the sheet S so as to be adjacent in the conveying direction to the image IMa having been recorded in the first recording operation. In addition, since the width-direction position of the sheet S has been adjusted by the position adjustment operation, the image IMb is recorded at an ideal position in the width direction on the sheet S.

Figure 12:
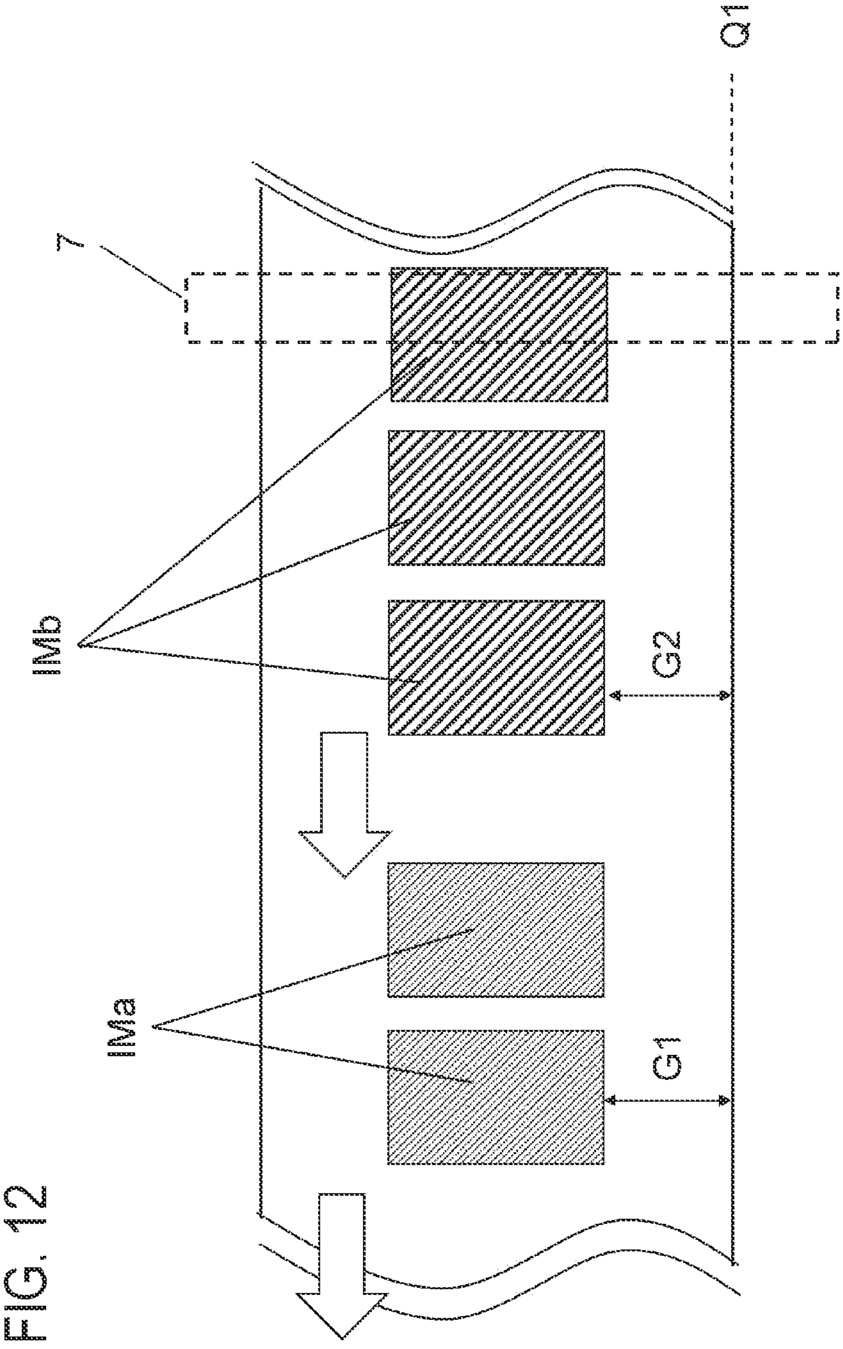
FIG. 12 is a diagram showing a situation where the second recording operation has been executed on a sheet of which a position has been adjusted.

FIG. 12 shows a situation where an image is recorded at an ideal position on the sheet S by the position adjustment operation. FIG. 12 is a top view of the sheet S as seen from a side of the ink-applied surface. Due to the position adjustment operation in the pre-reprinting step, the image IMa recorded by the first recording operation and the image IMb recorded by the second recording operation are recorded at a same position of the sheet S in the width direction. In other words, the gap G1 from the side end of the sheet S to the image IMa and the gap G2 from the side end of the sheet S to the image IMb become equal to each other.

As described above, by executing the position adjustment operation of adjusting the position of the sheet S in the conveying direction and the width direction after the first recording operation, the image IMa is adjusted to become adjacent to the recording position and the position of the side end of the sheet S is adjusted to be positioned at the target side end position Q1. Therefore, according to the configuration described above, the wasted paper region of the sheet S can be reduced and, at the same time, a width-direction position of an image recording position can be adjusted to suppress a decline in the appearance of the image during a second recording operation.

Example of Sequential Operation

Figure 13:
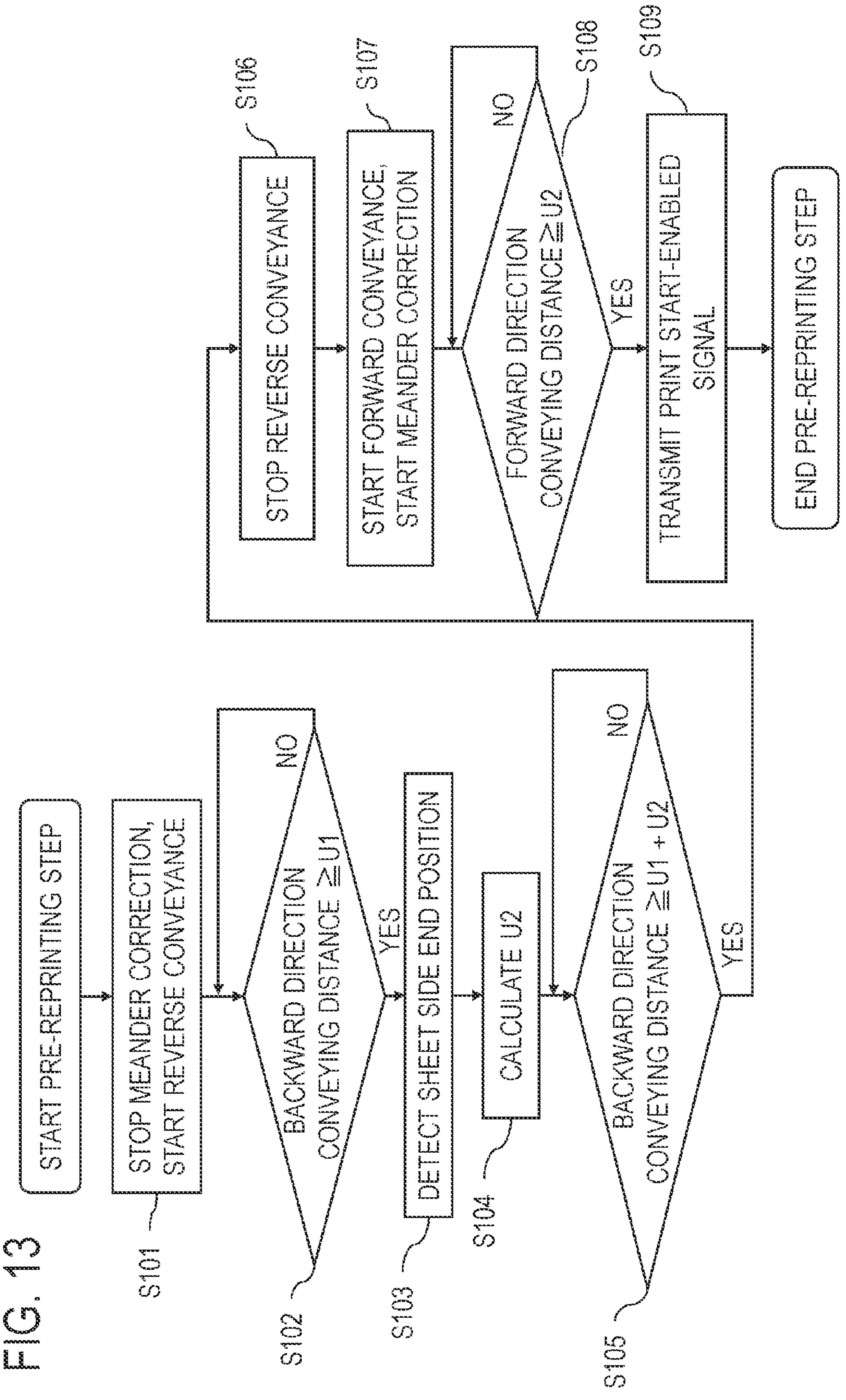
FIG. 13 is a flow chart of a pre-reprinting step according to the first embodiment.

Next, a sequential operation in the pre-reprinting step will be illustratively described. FIG. 13 is a flow chart showing a sequential operation of the pre-reprinting step. The position adjustment operation that is executed as the pre-reprinting step is roughly divided into a reverse conveyance step of performing conveyance of the sheet S in the backward direction D2 and a forward conveyance step of performing conveyance of the sheet S in the forward direction D1.

The pre-reprinting step is executed due to the control portion 31 receiving a start command of the pre-reprinting step after the execution of a print job (the first recording operation). When the pre-reprinting step is started, first, as step (hereinafter, S) 101, the control portion 31 stops a meander correction by the meander correcting portion 5 and starts a reverse conveyance of the sheet S. In the reverse conveyance step of the sheet S, in order to prevent an erroneous correction during the reverse conveyance by the meander correcting portion 5, a meander correction by the meander correcting portion 5 is stopped during the reverse conveyance. At this point, the meander correcting portion 5 is desirably stopped in a state where a turning angle in a previous print job is retained. In addition, since a print operation and the like are not performed during the reverse conveyance, a conveying speed of the reverse conveyance can be set to any speed. In order to prevent an increase in meandering due to a decline in tension during the conveyance, the tension imparted to the sheet S during the reverse conveyance is desirably equal to or greater than the tension during a recording operation.

When the reverse conveyance is started, as S102, a process of monitoring a conveying distance of the reverse conveyance is executed. In addition, when the conveying distance in the backward direction D2 reaches the first conveying distance U1 or, in other words, when conveying distance ≥U1 is satisfied, a transition is made to S103. The first conveying distance U1 is a distance from the first stop position P1 to the second stop position P2. The conveying distance in the backward direction D2 may be measured by an encoder or the like or may be derived from a set conveying speed and a time measurement. In the present operation example, the first conveying distance U1 is set in advance as a predetermined value.

In S103, a detection of a side end position of the sheet S after being conveyed by the first conveying distance U1 is performed. An amount of meander of the sheet S is measured due to the detection of the width-direction position of the sheet S by the detection sensor 5*d* of the meander correcting portion 5. Subsequently, in S104, the second conveying distance U2 is calculated on the basis of a result of the detection by the detection sensor 5*d*. By adopting a configuration in which the second conveying distance U2 is calculated on the basis of the result of the detection by the detection sensor 5*d* or, in other words, the side end position of the sheet S, the control portion 31 can set a proper second conveying distance U2 and the sheet S can be prevented from being excessively conveyed in reverse. Consequently, an increase in downtime due to the pre-reprinting step can be suppressed. Details of the method of calculating the second conveying distance U2 based on the result of the detection by the detection sensor 5*d* will be provided later.

In the present operation example, the detection of an amount of meander and the calculation of the second conveying distance U2 are performed during the reverse conveyance of the sheet S. When applying the present invention, a configuration may be adopted in which conveyance is temporarily stopped once the conveying distance in the backward direction D2 reaches the first conveying distance U1 and the detection of an amount of meander and the calculation of the second conveying distance U2 are performed during the stoppage.

S105 is a process of monitoring a conveying distance after the conveying distance in the backward direction D2 exceeds the first conveying distance U1. Once the conveying distance in the backward direction D2 reaches a sum of the first conveying distance U1 and the second conveying distance U2 or, in other words, when conveying distance ≥U1+U2 is satisfied, a transition is made to S106.

In S106, the reverse conveyance of the sheet S is stopped and the reverse conveyance step ends. Subsequently, in S107, the control portion 31 starts a conveyance of the sheet S in the forward direction D1. In addition, the control portion 31 starts a meander correction by the meander correcting portion 5 upon starting the forward conveyance step. In other words, in the forward conveyance step, the sheet S is conveyed forward while having the width-direction position of the sheet S being adjusted.

S108 is a process of monitoring a conveying distance of the forward conveyance. Due to S108, it is confirmed that the conveying distance in the forward direction D1 has equaled the second conveying distance U2 and that an image recorded on the sheet S in a previous print job has returned to the second stop position P2. The conveying distance in the forward direction D1 may similarly be measured by an encoder or the like or may similarly be derived from a set conveying speed and a time measurement.

Once the conveying distance in the forward direction D1 reaches the second conveying distance U2 that is a target conveying distance, in S109, the control portion 31 transmits a print start-enabled signal and ends the pre-reprinting step. After the pre-reprinting step ends, a next print job may be started immediately or the conveyance may be temporarily stopped and a transition may be made to a standby state. When immediately executing a print job, printing is desirably performed by shifting to a suitable conveying speed and adjusting timing using a mark pattern or the like having been printed beforehand.

Control System

Figure 14:
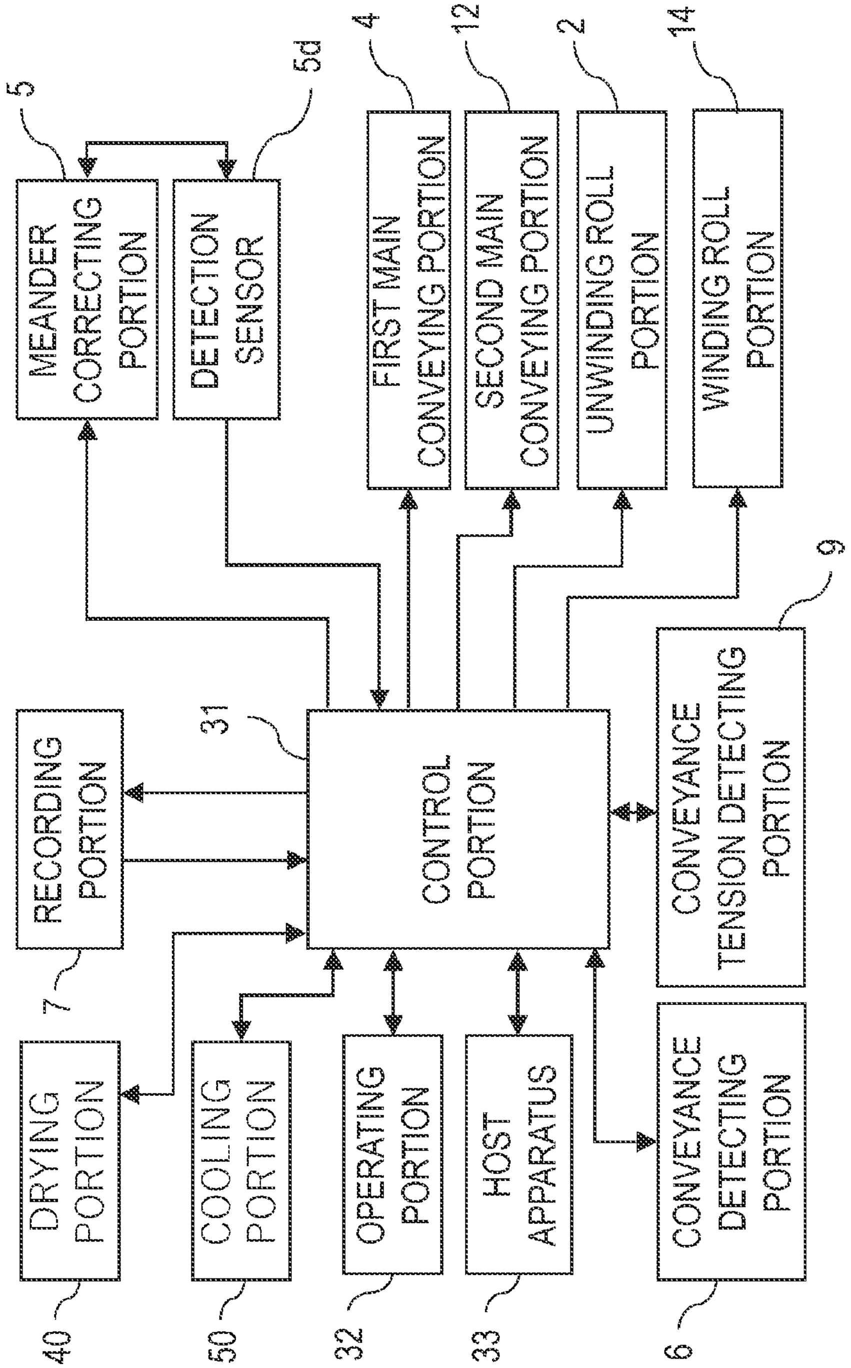
FIG. 14 is a block diagram of a control system of the recording apparatus according to the first embodiment.

Next, a control system of the recording apparatus 1 will be described. FIG. 14 is a block diagram of a control system of the recording apparatus 1 according to the first embodiment. During a recording operation (printing operation), commands are respectively transmitted from the control portion 31 to the first main conveying portion 4, the second main conveying portion 12, the unwinding roll portion 2, and the winding roll portion 14 so as to operate at a conveying speed and in a rotation direction set in advance. Furthermore, the control portion 31 can operate the drying portion 40 and the cooling portion 50 to control a temperature in each unit.

The conveyance tension detecting portion 9 measures a conveyance tension upon being supplied power from the control portion 31. In the first embodiment, after the control portion 31 receives a detected value of the tension of the sheet S having been detected by the conveyance tension detecting portion 9, the control portion 31 issues a change command of a conveying speed to the first main conveying portion 4 and the second main conveying portion 12 to adjust a conveyance tension. Alternatively, a configuration may be adopted in which the conveyance tension detecting portion 9 is controlled in a closed manner in the first main conveying portion 4 and the second main conveying portion 12 without involving the control portion 31. The operations of the first main conveying portion 4, the second main conveying portion 12, the unwinding roll portion 2, and the winding roll portion 14 described above are controlled in a similar manner by the control portion 31 both during a forward conveyance and during a reverse conveyance.

The meander correcting portion 5 operates by receiving a command to supply power and a command to start and stop control from the control portion 31. The detection sensor **5*d* receives supply of power from the meander correcting portion 5 and transmits a detected amount of meander of the sheet S to the meander correcting portion 5. The meander correcting portion 5 performs an adjustment of a correction amount based on the amount of meander of the sheet S sent from the detection sensor 5*d*. In the first embodiment, since the control portion 31 only issues an instruction to start and stop correction control to the meander correcting portion 5, a correction operation by the meander correcting portion 5 is basically an independent control. In the reverse conveyance operation described above, the detection sensor 5*d* transmits a measured amount of meander of the sheet S to the control portion 31. In the position adjustment operation, the control portion 31 calculates the second conveying distance U2 based on the received amount of meander and respectively issues instructions to the first main conveying portion 4, the second main conveying portion 12, the unwinding roll portion 2, and the winding roll portion 14 to continue the reverse conveyance by an amount corresponding to the second conveying distance U2**.

Second Conveying Distance Determination Method

Figure 15:
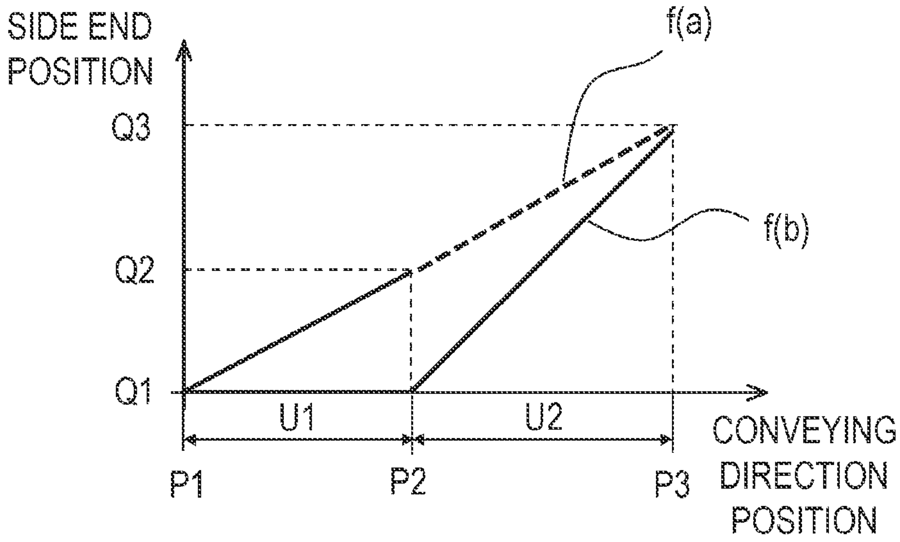
FIG. 15 is an explanatory diagram of a calculation method of a second conveying distance according to the first embodiment.

Next, a determination method of the second conveying distance U2 will be described on the basis of the operation example described above. FIG. 15 is an explanatory diagram of a calculation method of the second conveying distance U2. FIG. 15 shows a graph of which an ordinate represents the side end position of the sheet S in the recording portion 7 and an abscissa represents a position in the conveying direction of an image on the sheet S. In the present operation example, the position of the sheet S in the conveying direction is indicated on the basis of a position of an image IMa having been recorded in a recording operation immediately preceding the position adjustment operation.

When calculating the second conveying distance U2, first, a meander function f(a) during a reverse conveyance is acquired. The meander function f(a) is a function that represents a relationship between a conveying distance and a side end position of the sheet S during a reverse conveyance of the sheet S in a position adjustment operation. The meander function f(a) is acquired on the basis of the position in the conveying direction and a side end position of the sheet S before the reverse conveyance is started and the position in the conveying direction and a side end position of the sheet S after the sheet S has been conveyed by the first conveying distance U1. In the present operation example, the side end position of the sheet S when the image IMa is positioned at the first stop position P1 is a target side end position Q1 and the side end position of the sheet S when the image IMa is positioned at the second stop position P2 is a side end position Q2. If the position of the image IMa in the conveying direction is denoted by X and the side end position of the sheet S is denoted by Y, then the meander function f(a) is a function that passes a point expressed as X=P1, Y=Q1 and a point expressed as X=P2, Y=Q2. FIG. 15 shows, as an example, a case where the meander function f(a) is a linear function.

Next, the second conveying distance U2 is calculated on the basis of the meander function f(a) and a meander correction function f(b). In this case, the meander correction function f(b) is a function that is set in advance and that represents a relationship between a conveying distance and a meander correction amount of the sheet S during a forward conveyance of the sheet S in a position adjustment operation. The meander correction function f(b) is used to calculate a conveying distance that is required to complete a meander correction with respect to an amount of meander of the sheet S. The meander correction function f(b) is a function that passes a point expressed as X=P2, Y=Q1. FIG. 15 shows, as an example, a case where the meander correction function f(b) is a linear function.

The second conveying distance U2 is determined on the basis of the meander function f(a) and the meander correction function f(b). Specifically, an intersection point of the meander function f(a) and the meander correction function f(b) is obtained and, when coordinates of the intersection point are expressed as X=P3, Y=Q3, a third stop position P3 and a side end position Q3 are determined. In addition, the second conveying distance U2 being the distance from the second stop position P2 to the third stop position P3 is determined. In other words, in the first embodiment, the second conveying distance U2 is calculated on the basis of the target side end position Q1, the first stop position P1, the second stop position P2, and the meander correction function f(b) that are set in advance and the side end position Q2 and the meander function f(a) that are acquired during a position adjustment operation.

Figure 16:
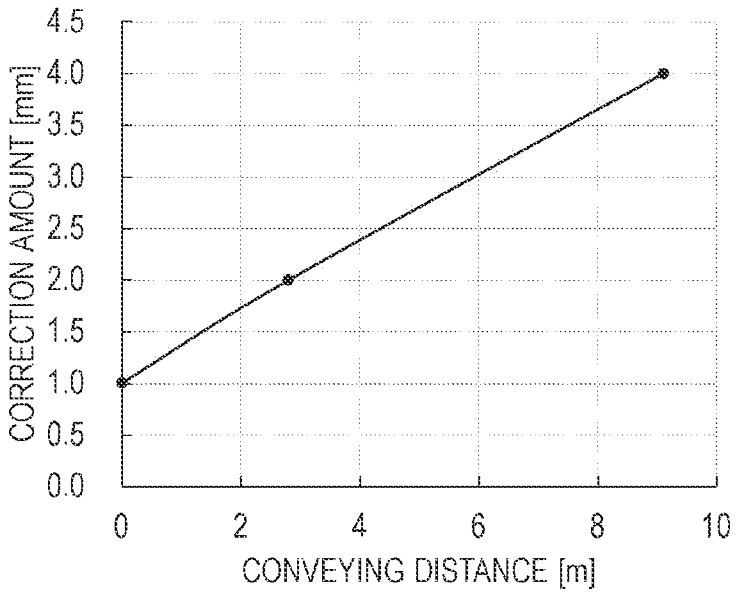
FIG. 16 is an explanatory diagram of a determination method of a meander correction function f(b) according to the first embodiment.

Next, an example of a determination method of the meander correction function f(b) will be described. FIG. 16 is an explanatory diagram of a determination method of the meander correction function f(b). FIG. 16 shows a graph of which an ordinate represents a correction amount of a side end position of the sheet S and an abscissa represents a conveying distance of the sheet S. The meander correction function f(b) can be determined on the basis of a result of an experiment on the correction of a meander of the sheet S by the meander correcting portion 5 having been performed in advance. In the first embodiment, since an inclination of the meander correction function f(b) being a linear function has been experimentally obtained in advance, the recording apparatus 1 is configured to be capable of calculating the second conveying distance U2. Since the meander correction function f(b) differs depending on an apparatus layout, a conveyance tension, or the like to be applied, the meander correction function f(b) is preferably experimentally or analytically determined according to the apparatus to be applied.

As described above, according to the first embodiment, since a conveying direction and the width-direction position of the sheet S can be adjusted by executing a position adjustment operation following a recording operation, a wasted paper region can be reduced and a decline in the appearance of the image can be suppressed. Furthermore, in the first embodiment, since a conveying distance of a reverse conveyance is determined on the basis of an amount of meander during the reverse conveyance, the position adjustment operation can be efficiently executed without excessively extending a reverse conveyance distance.

Modifications of First Embodiment

Next, modifications of the first embodiment according to the present invention will be described. Hereinafter, in the description of the modifications, components similar to those of the first embodiment will be denoted by same reference signs and descriptions thereof will be omitted, and only characteristic components of the modifications will be described.

First, a first modification will be described. The first modification differs from the first embodiment in a configuration of the position detecting portion that detects the width-direction position of the sheet S.

Figure 17A:
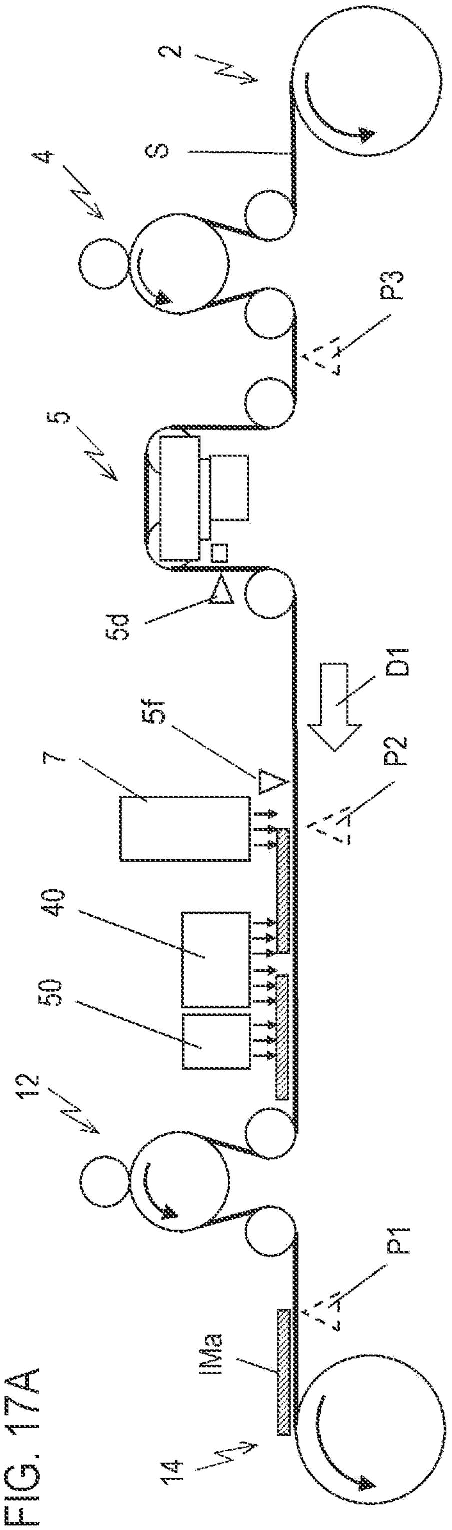
FIGS. 17A and 17B are schematic views showing a configuration of a recording apparatus according to a first modification.
Figure 17B:
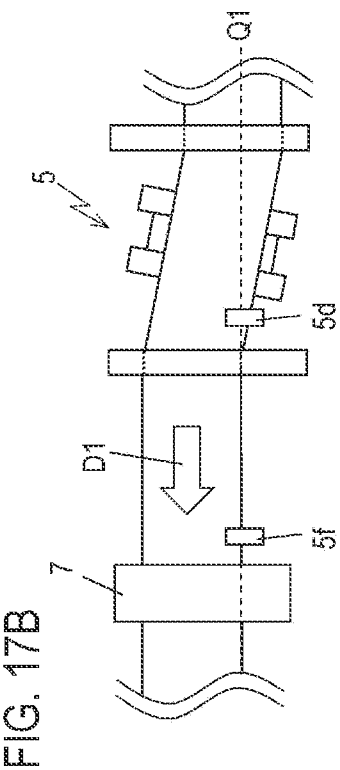

FIG. 17A is a schematic sectional view of the recording apparatus 1 according to the first modification. FIG. 17A shows a situation where a recording operation of recording an image IMa on the sheet S is being executed. FIG. 17B is a schematic top view of the meander correcting portion 5 in the state shown in FIG. 17A. In the first embodiment, the detection sensor 5*d* functions as a sensor for control of the meander correcting portion 5 and a sensor for detection of an amount of displacement of the position in the width direction of the sheet S in the recording portion 7. On the other hand, the first modification differs from the first embodiment in that a detection sensor 5*f* is provided in addition to the detection sensor 5*d*.

The detection sensor 5*f* is provided in a vicinity of the recording portion 7 and detects the width-direction position of the sheet S. By arranging a position detecting portion that detects the width-direction position of the sheet S in a vicinity of the recording portion 7 in this manner, an amount of meander in the recording portion 7 can be detected with higher accuracy and meander correction can be performed with higher accuracy.

Next, a second modification will be described. The second modification differs from the first embodiment in a calculation method of the second conveying distance U2.

Figure 18:
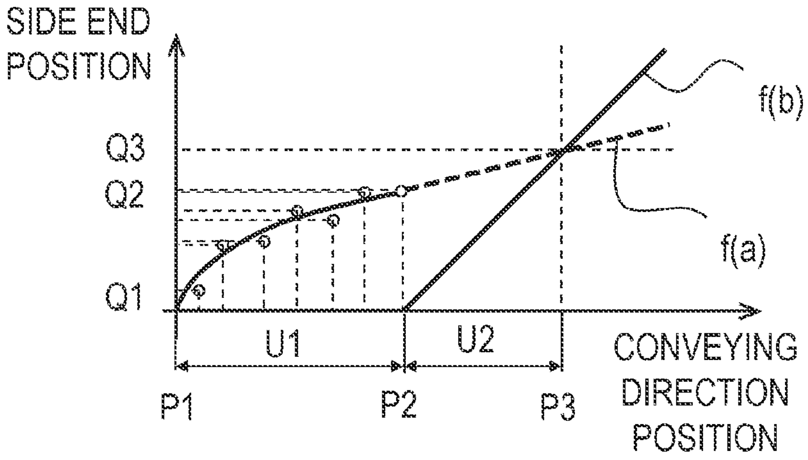
FIG. 18 is an explanatory diagram of a calculation method of the second conveying distance according to a second modification.

FIG. 18 is a graph showing a calculation method of the second conveying distance U2 according to the second modification. In the graph shown in FIG. 18, an ordinate represents the side end position of the sheet S in the recording portion 7 and an abscissa represents a position in the conveying direction of an image on the sheet S in a similar manner to the graph shown in FIG. 15.

In the first embodiment, the meander function f(a) is determined as a linear function based on the two points expressed as X=P1, Y=Q1 and X=P2, Y=Q2. On the other hand, in the second modification, a measurement of the side end position of the sheet S by the detection sensor 5*d* is performed a plurality of times while conveying the sheet S in reverse from the first stop position P1 to the second stop position P2. In addition, the meander function f(a) is determined on the basis of the plurality of obtained detection results and the second conveying distance U2 is calculated on the basis of the meander function f(a) and the meander correction function f(b). FIG. 18 shows, as an example, a case where the meander correction function f(b) is an nth order function (where n is an integer greater than or equal to 2). By determining the meander function f(a) based on a larger number of detection results in this manner, the meander function f(a) is to more accurately represent a meandering state of the sheet S and enables a more appropriate second conveying distance U2 to be calculated. Consequently, a meander of the sheet S can be more reliably corrected in a position adjustment operation and a reduction in a downtime due to the position adjustment operation can be achieved.

Second Embodiment

Next, a second embodiment according to the present invention will be described. The second embodiment differs from the first embodiment in a determination method of the second conveying distance U2. Hereinafter, in the description of the second embodiment, components similar to those of the first embodiment will be denoted by same reference signs and descriptions thereof will be omitted, and only characteristic components of the second embodiment will be described.

In the first embodiment, the second conveying distance U2 is determined on the basis of a detection result by the detection sensor 5*d* in order to perform an adjustment of the width-direction position of the sheet S (meander correction). On the other hand, in the second embodiment, the second conveying distance U2 is determined on the basis of a fixation temperature during a recording operation in the drying portion 40 in addition to a detection result by the detection sensor 5*d*.

Temperature Adjustment of Drying Portion 40

First, temperature adjustment of the drying portion 40 after a recording operation will be described. The temperature of the drying portion 40 during the recording operation will be referred to as a fixation temperature TU. When the sheet S remains inside of the drying portion 40 in a state where the temperature of the drying portion 40 is the fixation temperature TU, there is a risk that a problem such as a deformation of the sheet S due to heating may occur. In consideration thereof, after the recording operation is completed, control is preferably performed to lower the temperature of the drying portion 40 from the fixation temperature TU to a standby temperature TL while continuously conveying the sheet S. In this case, the standby temperature TL is a temperature that does not adversely affect the sheet S.

In the second embodiment, after a recording operation is completed, a position adjustment operation in the pre-reprinting step is immediately started. In the pre-reprinting step, first, a reverse conveyance of the sheet S is started. The temperature of the drying portion 40 is the fixation temperature TU at the start of the reverse conveyance of the sheet S. Subsequently, the temperature of the drying portion 40 is brought down from the fixation temperature TU to the standby temperature TL while conveying the sheet S in reverse. Once the temperature of the drying portion 40 is brought down to the standby temperature TL, the conveyance of the sheet S can be stopped. In the second embodiment, a conveying speed during a forward conveyance of the sheet S in a recording operation is a printing speed VV and a conveying speed during a reverse conveyance of the sheet S in the position adjustment operation described above is a conveying speed VL1. In order to avoid adverse effects on the sheet S, the conveying speed VL1 is a slower speed than the printing speed VV.

When starting a next recording operation after the position adjustment operation is completed, the drying portion 40 must be reheated from the standby temperature TL to the fixation temperature TU in order to fix the image on the sheet S. In the second embodiment, the temperature of the drying portion 40 is heated to the fixation temperature TU during a forward conveyance after the reverse conveyance in the position adjustment operation. A conveying speed during the forward conveyance of the sheet S during position adjustment is VL2. In order to avoid adverse effects on the sheet S, the conveying speed VL2 is a slower speed than the printing speed VV.

By lowering and raising the temperature of the drying portion 40 in combination with a position adjustment operation as described above, an increase in downtime can be suppressed while preventing an occurrence of a deformation or the like of the sheet S. On the other hand, when an amount of meander of the sheet S due to a reverse conveyance is small and the second conveying distance U2 is short, there is a risk that the temperature of the drying portion 40 cannot be raised to the fixation temperature TU during a forward conveyance of the sheet S in the position adjustment operation. In consideration thereof, in the second embodiment, the second conveying distance U2 being a conveying distance during a reverse conveyance is determined so that a sufficient conveying distance for raising the temperature of the drying portion 40 to the fixation temperature TU can be secured.

Figure 19:
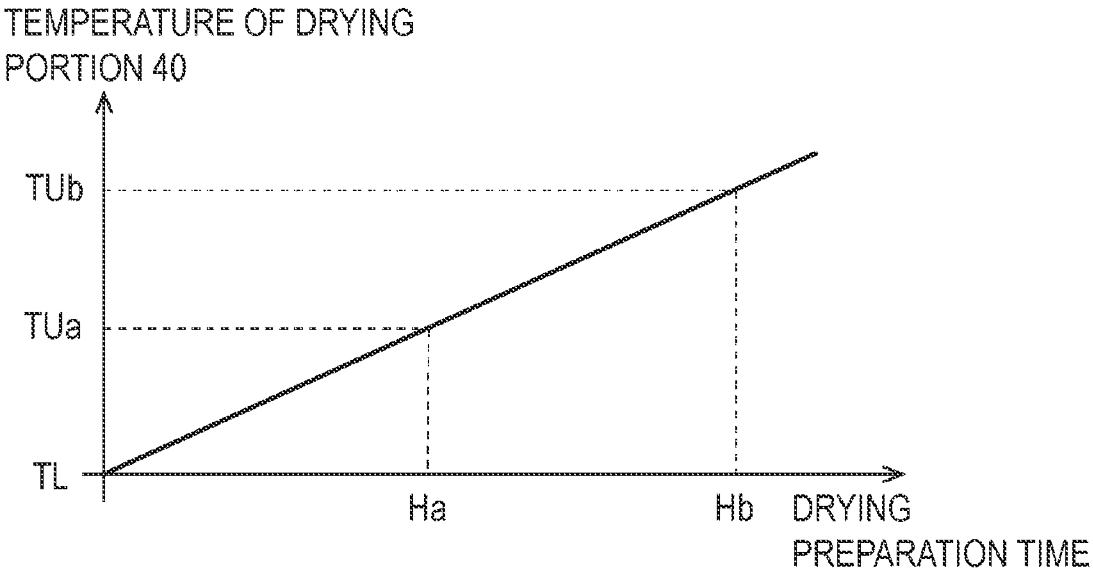
FIG. 19 is a diagram showing a relationship between a temperature and a drying preparation time of a drying portion according to the second embodiment.

FIG. 19 is an explanatory diagram of a relationship between the temperature of the drying portion 40 and a drying preparation time H that is required to raise the temperature of the drying portion 40 from the standby temperature TL to the fixation temperature TU. A value of the fixation temperature TU is set for each material of the sheet S. When the fixation temperature TU is high, a fixation time can be set short and the printing speed VV can also be set high. On the contrary, when the fixation temperature TU is high, the drying preparation time H that is required to raise the temperature of the drying portion 40 from the standby temperature TL to the fixation temperature TU increases.

FIG. 19 shows, as an example, a fixation temperature TUa and a drying preparation time Ha with respect to a material A and a fixation temperature TUb and a drying preparation time Hb with respect to a material B. For example, when the standby temperature TL is 30° C., the material A is PVC (polyvinyl chloride), and the fixation temperature TUa is 50° C., the drying preparation time Ha is 60 seconds. For example, when the standby temperature TL is 30° C., the material B is PET (polyethylene terephthalate), and the fixation temperature TUb is 100° C., the drying preparation time Hb is 120 seconds.

A conveying distance required for reheating the temperature of the drying portion 40 up to the fixation temperature TU will be referred to as a reheat conveying distance UD. The reheat conveying distance UD is obtained by multiplying the drying preparation time H by the conveying speed VL2. In the second embodiment, the conveying speed VL2 during a forward conveyance in the position adjustment operation is set to 50 mm/sec. Therefore, in the case of the material A described above, the reheat conveying distance UD is calculated as 60×0.05=3 m. In the case of the material B described above, the reheat conveying distance UD is calculated as 120×0.05=6 m. A conveying distance for reheating may be described as being sufficiently secured if the second conveying distance U2 being a conveying distance from the second stop position P2 during a reverse conveyance of the sheet S is equal to or longer than the reheat conveying distance UD.

Note that the various values such as the fixation temperature TU, the standby temperature TL, and the conveying speed VL2 of the sheet S described above are merely examples and can be modified as deemed appropriate. In addition, the conveying speed VL1 of the sheet S during a reverse conveyance may be set so that the temperature of the drying portion 40 drops from the fixation temperature TU to the standby temperature TL before the sheet S reaches the third stop position P3. Setting the various values in accordance with the material of the sheet S and an apparatus configuration enables images to be fixed at a suitable temperature and enables a time required for a position adjustment operation to be reduced.

Second Conveying Distance Determination Method

Next, a determination method of the second conveying distance U2 according to the second embodiment will be described in detail. When determining the second conveying distance U2, a correction conveying distance UE required for an adjustment of the width-direction position of the sheet S is used in addition to the reheat conveying distance UD described above. The correction conveying distance UE is a distance required to perform an adjustment of the width-direction position of the sheet S during a forward conveyance of the sheet S in the position adjustment operation.

The correction conveying distance UE of the sheet S is calculated in a similar manner to the second conveying distance U2 in the first embodiment. In other words, the correction conveying distance UE is calculated on the basis of the meander function f(a) and the meander correction function f(b). The meander function f(a) is determined on the basis of the first stop position P1, the second stop position P2, the side end position Q2 of the sheet S detected by the detection sensor **5*d***, and the like. The meander correction function f(b) is a function set in advance.

In the second embodiment, a configuration is adopted in which the reheat conveying distance UD and the correction conveying distance UE are calculated and whichever is larger is then adopted as the second conveying distance U2. Adopting such a configuration enables the width-direction position of the sheet S to be adjusted in a position adjustment operation that is executed following a recording operation and enables the temperature of the drying portion 40 to be reliably raised to the fixation temperature TU.

Figure 20:
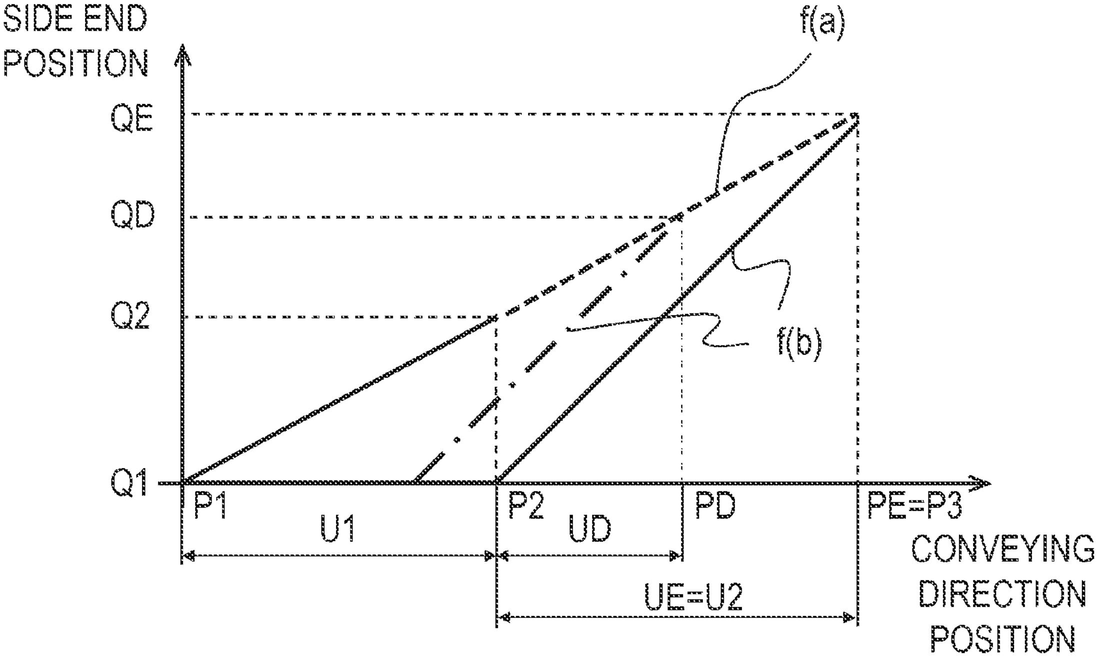
FIG. 20 is an explanatory diagram of a calculation method of the second conveying distance according to the second embodiment.
Figure 21:
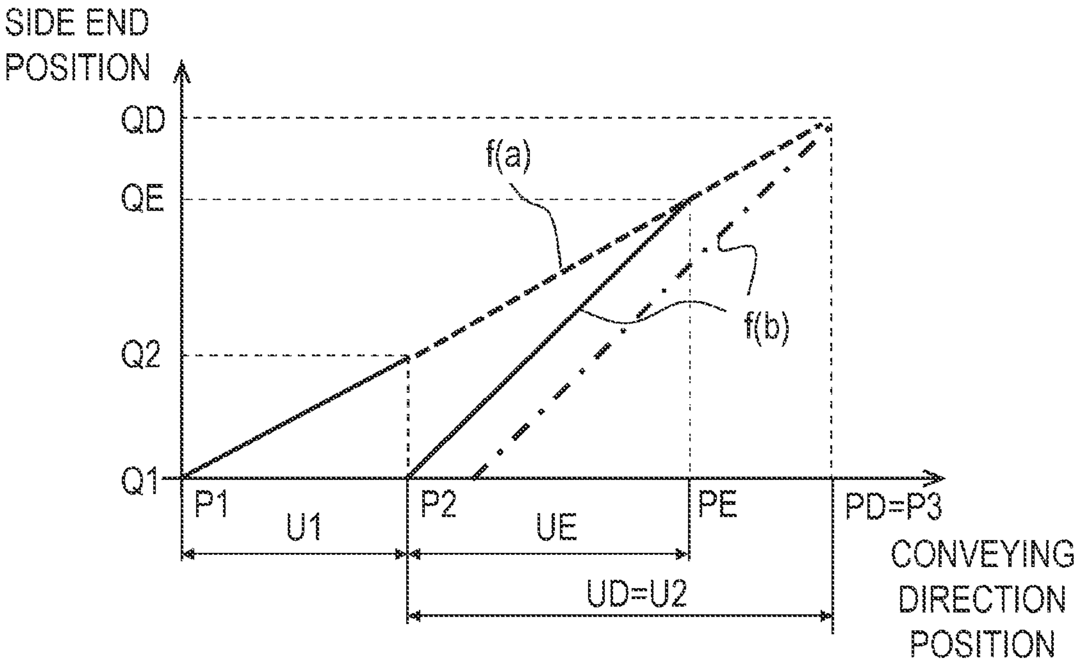
FIG. 21 is an explanatory diagram of a calculation method of the second conveying distance according to the second embodiment.

FIGS. 20 and 21 are, respectively, explanatory diagrams showing an example of a determination method of the second conveying distance U2. FIGS. 20 and 21 show a graph of which an ordinate represents the side end position of the sheet S in the recording portion 7 and an abscissa represents a position in the conveying direction of an image on the sheet S. In FIGS. 20 and 21, a position of the sheet S having been conveyed in reverse by the reheat conveying distance UD from the second stop position P2 is shown as a reheating position PD and a position of the sheet S having been conveyed in reverse by the correction conveying distance UE from the second stop position P2 is shown as a correcting position PE.

FIG. 20 shows an example in which the correction conveying distance UE is greater than the reheat conveying distance UD. When UE>UD, selecting the reheat conveying distance UD as the second conveying distance U2 (UD=U2) causes the second conveying distance U2 to be shorter than the correction conveying distance UE and prevents an adjustment of the width-direction position of the sheet S from being sufficiently performed during a forward conveyance in a position adjustment operation. As a result, the side end position of the sheet S cannot be adjusted to the target side end position Q1 and the width-direction position of an image recorded on the sheet S becomes displaced. In consideration thereof, in the second embodiment, the correction conveying distance UE is selected as the second conveying distance U2 (U2=UE) when UE>UD and the third stop position P3 after a reverse conveyance of the sheet S equals the correcting position PE (P3=PE).

FIG. 21 shows an example in which the reheat conveying distance UD is greater than the correction conveying distance UE. When UD>UE, selecting the correction conveying distance UE as the second conveying distance U2 (UE=U2) causes the second conveying distance U2 to be shorter than the correction conveying distance UE and prevents the temperature of the drying portion 40 from rising sufficiently during a forward conveyance in a position adjustment operation. As a result, fixing in the drying portion 40 is not suitably performed and a risk of an occurrence of an image defect arises. In consideration thereof, in the second embodiment, the reheat conveying distance UD is selected as the second conveying distance U2 (U2=UD) when UD>UE and the third stop position P3 after a reverse conveyance of the sheet S equals the reheating position PD (P3=PD).

As described above, according to the second embodiment, since a conveying direction and the width-direction position of the sheet S can be adjusted by executing a position adjustment operation following a recording operation, a wasted paper region can be reduced and a decline in the appearance of the image can be suppressed. In addition, since the temperature of the drying portion 40 can be lowered and raised in the position adjustment operation, an adverse effect to the sheet S and a decline in the appearance of the image can be suppressed. Furthermore, since a position adjustment of the sheet S and a temperature adjustment of the drying portion 40 can be executed in parallel, an increase in downtime can be suppressed.

Example of Sequential Operation

Figure 22:
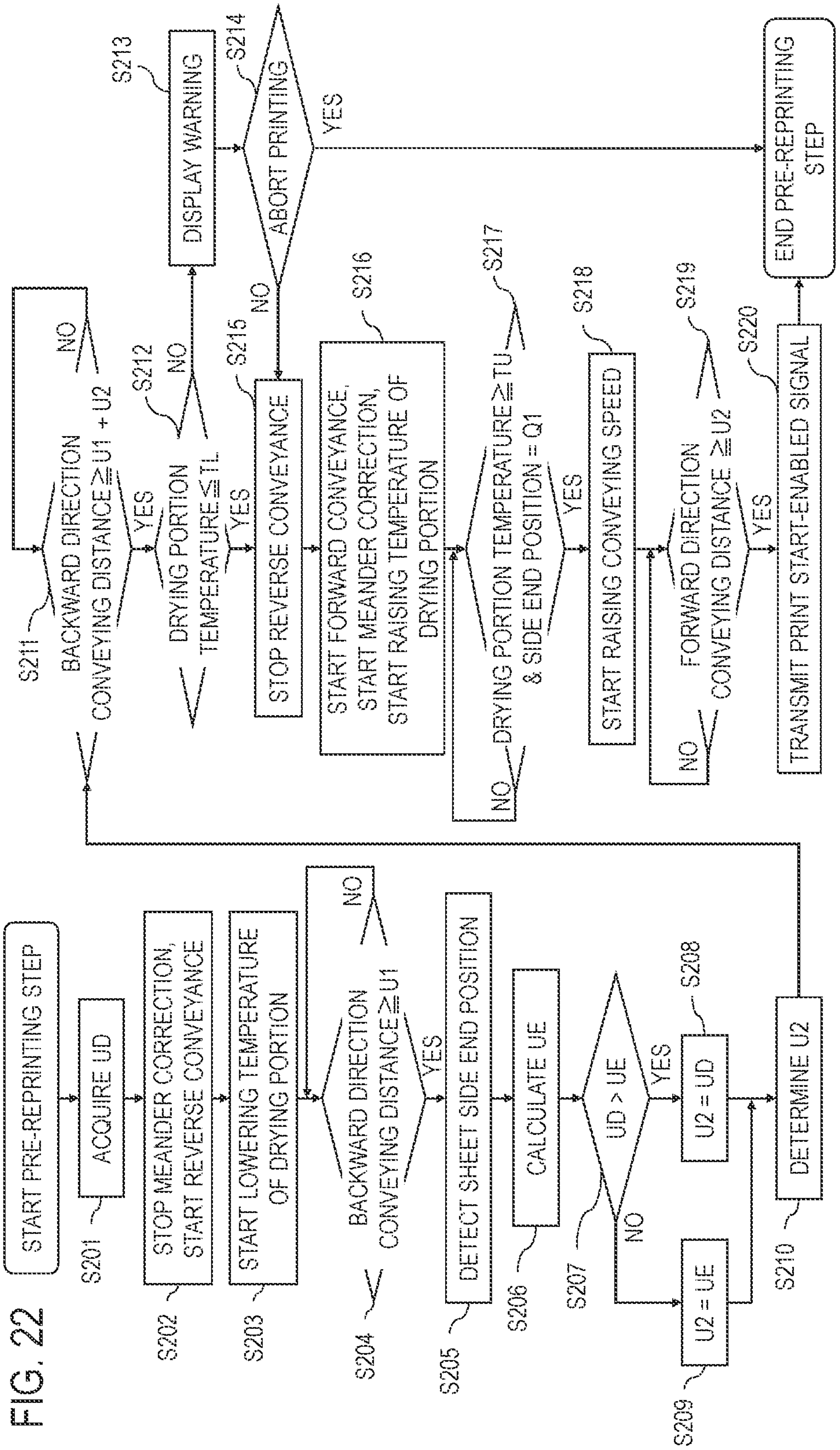
FIG. 22 is a flow chart of the pre-reprinting step according to the second embodiment.

Next, a sequential operation in the pre-reprinting step according to the second embodiment will be illustratively described. FIG. 22 is a flow chart showing a sequential operation of the pre-reprinting step. The position adjustment operation that is executed as the pre-reprinting step is roughly divided into a reverse conveyance step of performing a conveyance of the sheet S in the backward direction D2 and a forward conveyance step of performing a conveyance of the sheet S in the forward direction D1. In the second embodiment, a temperature lowering step of lowering the temperature of the drying portion 40 to the standby temperature TL is executed in parallel with the reverse conveyance step and a temperature raising step of raising the temperature of the drying portion 40 to the fixation temperature TU is executed in parallel with the forward conveyance step.

The pre-reprinting step is executed due to the control portion 31 receiving a start command of the pre-reprinting step after the execution of a print job (the first recording operation). First, in S201, the reheat conveying distance UD in accordance with a material of the sheet S of a print job (second recording operation) of reprinting is acquired. Information related to the material of the sheet S is acquired by the control portion 31 based on input information to the operating portion 32 or the like.

Next, in S202, the control portion 31 stops a meander correction by the meander correcting portion 5 and starts a reverse conveyance of the sheet S. The conveying speed of the sheet S at this point is the conveying speed VL1. In addition, lowering of the temperature of the drying portion 40 is started in S203. During a reverse conveyance of the sheet S, the temperature of the drying portion 40 is controlled so as to gradually drop from the fixation temperature TU toward the standby temperature TL.

When the reverse conveyance is started, as S204, a process of monitoring a conveying distance of the reverse conveyance is executed. In addition, when the conveying distance in the backward direction D2 reaches the first conveying distance U1 or, in other words, when conveying distance ≥U1 is satisfied, a transition is made to S205. The conveying distance in the backward direction D2 may be measured by an encoder or the like or may be derived from a set conveying speed and a time measurement. In the present operation example, the first conveying distance U1 is set in advance as a predetermined value.

In S205, a detection of a side end position of the sheet S after being conveyed by the first conveying distance U1 is performed. An amount of meander of the sheet S is measured due to the detection of a conveying position of the sheet S in the width direction by the detection sensor **5*d* of the meander correcting portion 5. Subsequently, in S206, the correction conveying distance UE is calculated on the basis of a result of the detection by the detection sensor 5*d*. By adopting a configuration in which the correction conveying distance UE is calculated on the basis of the result of the detection by the detection sensor 5*d* or, in other words, the side end position of the sheet S, the control portion 31 can set a proper second conveying distance U2 and the sheet S can be prevented from being excessively conveyed in reverse. In this manner, both the reheat conveying distance UD that is required to raise the temperature of the drying portion 40** from the standby temperature TL to the fixation temperature TU and the correction conveying distance UE required for an adjustment of the width-direction position of the sheet S are acquired.

In S207, the control portion 31 compares magnitudes of the reheat conveying distance UD and the correction conveying distance UE and, in a following step, a value of whichever is greater is selected as the second conveying distance U2. Specifically, when UD>UE (YES in S207), a transition is made to S208 and U2=UD is adopted. On the other hand, when UD≤UE (NO in S207), a transition is made to S209 and U2=UE is adopted.

In addition, in S210, the second conveying distance U2 is determined. When determining the second conveying distance U2, a value of the reheat conveying distance UD or the correction conveying distance UE may be used as-is or the value may be corrected if individual variability, an installation environment factor, or the like makes such a correction necessary. When determining the second conveying distance U2, suitably, a gap amount between the image IMa in the first recording operation and the image IMb in the second recording operation and an acceleration distance required to raise the conveying speed of the sheet S from the conveying speed VL2 for reheating to the printing speed VV for a recording operation are taken into consideration. For example, in S210, updating U2 to U2+gap amount+acceleration distance enables the conveying-direction position of the sheet S to be adjusted with greater detail.

S211 is a process of monitoring a conveying distance after the conveying distance in the backward direction D2 exceeds the first conveying distance U1. Once the conveying distance in the backward direction D2 reaches a sum of the first conveying distance U1 and the second conveying distance U2 or, in other words, when conveying distance ≥U1+U2 is satisfied, a transition is made to S212.

In S212, the control portion 31 determines whether or not the temperature of the drying portion 40 is equal to or lower than the standby temperature TL. When the temperature of the drying portion 40 is not equal to or lower than the standby temperature TL (NO in S212), a transition is made to S213 and a warning intended for a user is displayed. The user having received the warning inputs, to the operating portion 32, whether to continue printing as-is or to abort printing. When printing is aborted (YES in S214), the pre-reprinting step ends.

When the temperature of the drying portion 40 is equal to or lower than the standby temperature TL in S212 (YES in S212) or when it is determined in S214 to continue printing (NO in S214), a transition is made to S215. In S215, the reverse conveyance of the sheet S is stopped. When each operation has been normally performed, since the temperature of the drying portion 40 when the reverse conveyance of the sheet S is stopped is equal to or lower than the standby temperature TL, a deformation of the sheet S is suppressed.

In S216, the control portion 31 starts a forward conveyance of the sheet S at the conveying speed VL2. At this point, a meander correction by the meander correcting portion 5 and raising of the temperature of the drying portion 40 are started. In other words, an adjustment of the width-direction position of the sheet S and reheating of the drying portion 40 are performed in parallel during the forward conveyance of the sheet S.

In S217, the control portion 31 monitors the temperature of the drying portion 40 and the side end position of the sheet S. The temperature of the drying portion 40 is monitored by a temperature sensor (not illustrated) as to whether or not the temperature has risen to the fixation temperature TU. The side end position of the sheet S is monitored as to whether the side end position of the sheet S has been adjusted to the target side end position Q1. When it is confirmed that the temperature of the drying portion 40 has risen to or above the fixation temperature TU and the side end position of the sheet S has equaled the target side end position Q1, a transition is made to S218. Note that with respect to the side end position of the sheet S, an acceptable error of an amount of meander that can be accepted with respect to the target side end position Q1 may be provided and a determination may be made as to whether or not the amount of meander of the sheet S is within the acceptable error.

In S218, the control portion 31 raises the conveying speed of the sheet S from the conveying speed VL2 toward the printing speed VV. Providing such a step enables a recording operation to be executed without interruption at a suitable conveying speed when executing a print job immediately after the pre-reprinting step. In addition, even when the conveyance is temporarily stopped after the pre-reprinting step, a duration of the pre-reprinting step can be reduced.

S219 is a process of monitoring a conveying distance of the forward conveyance. Due to S219, it is confirmed that the conveying distance in the forward direction D1 has equaled the second conveying distance U2 and that an image recorded on the sheet S in a previous print job has returned to the second stop position P2. The conveying distance in the forward direction D1 may similarly be measured by an encoder or the like or may similarly be derived from a set conveying speed and a time measurement.

Once the conveying distance in the forward direction D1 reaches the second conveying distance U2 that is a target conveying distance, in S220, the control portion 31 transmits a print start-enabled signal and ends the pre-reprinting step. After the pre-reprinting step ends, a next print job may be started immediately or the conveyance may be temporarily stopped and a transition may be made to a standby state. When immediately executing a print job, printing is desirably performed by shifting to a suitable conveying speed and adjusting timing using a mark pattern or the like having been printed beforehand.

Determination of Implementing Reprinting Operation

Figure 23:
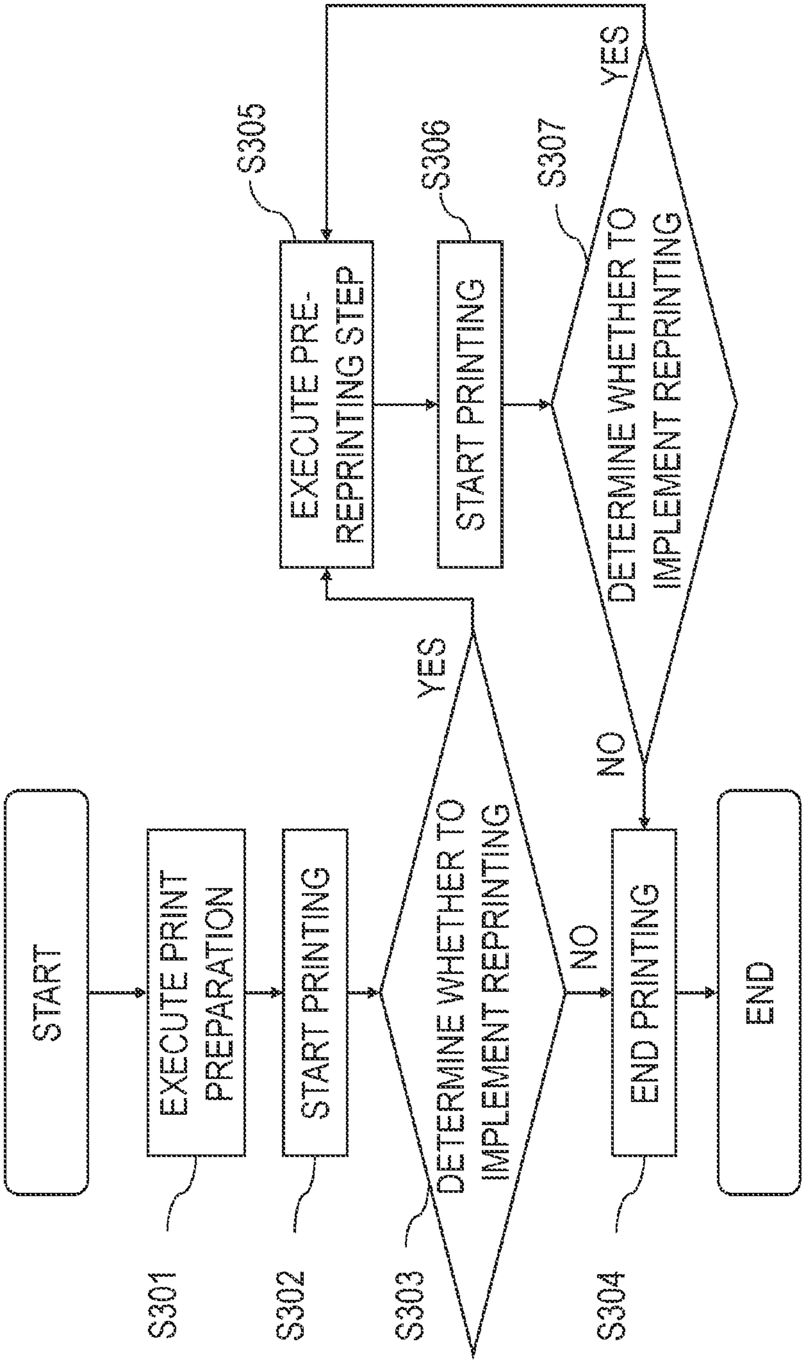
FIG. 23 is a flow chart of a determination of implementing a reprinting operation according to the second embodiment.

Next, an example of control to determine whether or not to implement a reprinting operation (second recording operation) will be described. FIG. 23 is a flow chart of a determination of implementing a reprinting operation.

When a print job is notified, first, a print preparation is executed in S301. In pre-printing preparation, the control portion 31 controls the first main conveying portion 4, the second main conveying portion 12, the unwinding roll portion 2, and the winding roll portion 14 to convey the sheet S at a low speed, corrects a meander of the sheet S with the meander correcting portion 5, and heats the drying portion 40 up to the fixation temperature TU.

Once the print preparation is completed, a printing operation (first recording operation) is started in S302. In the first recording operation, the conveying speed of the sheet S is raised to the printing speed VV and image formation is performed on the sheet S by the recording portion 7 in a state of the printing speed VV.

In S303, the control portion 31 makes a determination of implementation of a reprinting operation (second recording operation). When a next print job is set before the previous printing operation (first recording operation) ends, the next print job is executed as a reprinting operation.

When a next print job has not been set (NO in S303), a transition is made to S304. In S304, with the end of the previous printing operation, the control portion 31 lowers the temperature of the drying portion 40 from the fixation temperature TU to the standby temperature TL while conveying the sheet S at a low speed. Subsequently, the conveyance of the sheet S is stopped and the recording apparatus 1 is stopped.

When a next print job has been set (YES in S303), a transition is made to S305. In S305, the pre-reprinting step described above is executed. In addition, in S306, a reprinting operation is started in a state where a conveying direction and the width-direction position of the sheet S have been adjusted and the temperature of the drying portion 40 has been raised to the fixation temperature TU.

After the start of the reprinting operation, in S307, whether or not a reprinting operation is to be further executed is determined. When a next print job has been set (YES in S307), a transition is once again made to S305 and the pre-reprinting step is executed after the print job currently being executed ends. On the other hand, when a next print job has not been set (NO in S307), a transition is made to S304 and the recording apparatus 1 is subsequently stopped.

Other Embodiments

Note that the configurations of the recording apparatus 1 and operational sequences of the pre-reprinting step described above are merely examples of the present invention and the present invention is not solely limited to the embodiments described above. In addition, not all of the components of the respective embodiments described above are essential to applying the present invention.

For example, while a plurality of the recording heads 22 are provided in the recording portion 7 in the embodiments described above, only one recording head 22 may be provided. In addition, the recording heads 22 need not be full line heads and a serial method may be adopted in which ink is discharged from the recording heads 22 to form an ink image while a carriage mounted with the recording heads 22 moves in a paper width direction.

Furthermore, processing described as being performed by one apparatus may be executed in a shared manner by a plurality of apparatuses. Alternatively, processing described as being performed by different apparatuses may be executed by one apparatus. Which function is to be realized by what kind of a hardware component in a computer system can be modified in a flexible manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-067978, filed on Apr. 18, 2023, which is hereby incorporated by reference herein in its entirety.

What is claimed is:

1. A recording apparatus, comprising:

a recording portion that records an image on a sheet;

a conveying portion that conveys the sheet, while imparting tension to the sheet, in a forward direction being a conveying direction during a recording operation and a backward direction being opposite to the forward direction;

a position detecting portion that detects a position of the sheet in a width direction of the sheet, the width direction intersecting with the forward direction;

a position adjustment portion that adjusts a position of the sheet in the width direction on an upstream side, with respect to the forward direction, of the recording portion; and a control portion that executes a position adjustment operation in which, after conveying the sheet in the backward direction following a recording operation by the recording portion, the sheet is conveyed by the conveying portion in the forward direction while adjusting the position of the sheet in the width direction by the position adjustment portion, wherein a conveying distance of the sheet in the backward direction in the position adjustment operation is determined on the basis of a detection result by the position detecting portion.

2. The recording apparatus according to claim 1, wherein the conveying distance in the backward direction is determined so that an image recorded in the recording operation is moved to the upstream side of the recording portion with respect to the forward direction.

3. The recording apparatus according to claim 1, wherein the conveying distance in the backward direction is a conveying distance required by the position adjustment portion in order to adjust the position of the sheet in the width direction to a target position.

4. The recording apparatus according to claim 1, wherein the conveying distance in the backward direction is a sum of a predetermined first conveying distance and a second conveying distance that is determined on the basis of the detection result.

5. The recording apparatus according to claim 4, wherein the first conveying distance is a distance from a first stop position that is a position of an image on the sheet in a case where the recording operation has ended to a predetermined second stop position.

6. The recording apparatus according to claim 5, wherein the second stop position is a position in a vicinity of a recording position in the recording portion.

7. The recording apparatus according to claim 5, wherein the second conveying distance is determined on the basis of a meander function that is determined on the basis of the first stop position, the second stop position, and the detection result and on a predetermined meander correction function.

8. The recording apparatus according to claim 1, further comprising:

a drying portion that dries the image on the sheet having been recorded in the recording portion and that is positioned on a downstream side, in the forward direction, of the recording portion, wherein the conveying distance of the sheet in the backward direction in the position adjustment operation is determined on the basis of a fixation temperature during the recording operation in the drying portion in addition to the detection result by the position detecting portion.

9. The recording apparatus according to claim 8, wherein the control portion lowers a temperature of the drying portion to a predetermined standby temperature and subsequently raises the temperature to the fixation temperature in the position adjustment operation.

10. The recording apparatus according to claim 8, wherein the control portion selects, of a correction conveying distance that is determined on the basis of the detection result and a reheat conveying distance that is determined on the basis of the fixation temperature, whichever has a greater value as the conveying distance in the backward direction.

11. The recording apparatus according to claim 10, wherein the correction conveying distance is a conveying distance required by the position adjustment portion in order to adjust the position of the sheet in the width direction to a target position, and the reheat conveying distance is a conveying distance required to raise a temperature of the drying portion to the fixation temperature.

12. The recording apparatus according to claim 10, wherein the reheat conveying distance is calculated on the basis of the fixation temperature, a conveying speed of the sheet in the position adjustment operation, and a drying preparation time that is required to raise a temperature of the drying portion to the fixation temperature.

13. The recording apparatus according to claim 1, wherein the control portion stops a position adjustment of the sheet by the position adjustment portion while the sheet is being conveyed in the backward direction in the position adjustment operation.

14. The recording apparatus according to claim 1, wherein a tension imparted to the sheet during a conveyance of the sheet in the backward direction in the position adjustment operation is equal to or greater than a tension imparted to the sheet during the recording operation.

15. The recording apparatus according to claim 1, wherein a conveying speed of the sheet in the position adjustment operation is slower than a conveying speed of the sheet in the recording operation.

16. The recording apparatus according to claim 15, wherein the conveying distance in the backward direction is determined on the basis of an acceleration distance required to increase the conveying speed of the sheet in the position adjustment operation to the conveying speed of the sheet in the recording operation in addition to the detection result.

17. The recording apparatus according to claim 1, further comprising:

an unwinding roll portion that holds one end of the sheet in a roll shape and that supplies the sheet; and a winding roll portion that holds another end of the sheet in a roll shape and that winds up the sheet.

18. The recording apparatus according to claim 1, wherein the recording portion includes a line recording head that is provided along a conveying path of the sheet.

19. A sheet position adjustment method of a recording apparatus including a recording portion that records an image on a sheet, a conveying portion that conveys the sheet, while imparting tension to the sheet, in a forward direction being a conveying direction during a recording operation and a backward direction being opposite to the forward direction, a position detecting portion that detects a position of the sheet in a width direction of the sheet, the width direction intersecting with the conveying direction, and a position adjustment portion that adjusts a position in the width direction of the sheet on an upstream side, with respect to the forward direction of the recording portion, the sheet position adjustment method comprising the steps of:

performing a reverse conveyance in which, after an end of the recording operation, the sheet is conveyed in the backward direction by a conveying distance that is determined on the basis of a detection result by the position detecting portion; and performing a forward conveyance in which, after completion of the step of performing the reverse conveyance, the sheet is conveyed in the forward direction while adjusting the position of the sheet in the width direction with the position adjustment portion.

20. The sheet position adjustment method of a recording apparatus according to claim 19, wherein the recording apparatus includes a drying portion that dries an image on the sheet having been recorded in the recording portion, wherein the sheet position adjustment method further comprises the steps of: lowering a temperature of the drying portion to a predetermined standby temperature, the lowering of the temperature being executed in parallel with the step of performing the reverse conveyance; and raising the temperature of the drying portion to a fixation temperature during the recording operation, the raising of the temperature being executed in parallel with the step of performing the forward conveyance, wherein the conveying distance of the sheet in the step of performing the reverse conveyance is determined on the basis of the fixation temperature in addition to the detection result.

* * * * *